United States Patent [19]
Morando

[11] Patent Number: 6,004,507
[45] Date of Patent: Dec. 21, 1999

[54] MATERIAL FORMULATION FOR GALVANIZING EQUIPMENT SUBMERGED IN MOLTEN AND ALUMINUM ZINC MELTS

[75] Inventor: Jorge A. Morando, Grosse Ile, Mich.

[73] Assignee: Alphatech, Inc., Grosse Isle, Mich.

[21] Appl. No.: 08/958,614

[22] Filed: Oct. 27, 1997

Related U.S. Application Data

[63] Continuation-in-part of application No. 08/909,117, Aug. 11, 1997.

[51] Int. Cl.$^6$ .................................................. C22C 30/00
[52] U.S. Cl. ........................... 420/586; 420/585; 420/583
[58] Field of Search .................................... 420/585, 586, 420/583

[56] References Cited

U.S. PATENT DOCUMENTS 4,034,588  7/1977  Way et al. ................................. 72/209

FOREIGN PATENT DOCUMENTS 56-112447  9/1981  Japan .................................. 420/586.1
2128633    5/1984  United Kingdom .................... 420/586

Primary Examiner—Deborah Yee
Attorney, Agent, or Firm—Charles W. Chandler

[57] ABSTRACT

An article suitable for submergence in molten zinc, aluminum and aluminum/zinc melts. The article is formed of an alloy comprising from greater than 1.0% to less than 5.0% carbon; from greater to 10.0% to less than 30.0% chromium; from greater than or equal to 0.0% nickel to less than 30.0% nickel; from greater than 1.0% to less than 15.0% tungsten; from greater than 1.0% to less than 10.0% molybdenum; from greater than 0.0% to less than 10.0% vanadium; from greater than 0.0% to less than 10.0% niobium; from greater than 0.0% to less than 20.0% percent cobalt; from greater than 0.0% to less than 5.0% boron; from greater than 10.0% to less than 50.0% iron; from greater than or equal to 0.0% to less than or equal to 6.0% zirconium; from greater than 2 to less than 6.5% manganese; and from greater than or equal to 0.0% to less than 1.0% silicon.

14 Claims, 28 Drawing Sheets

INITIAL
BOUNDARY LAYER
↓

FeAl₃  Fe-Al

FeAl₃  Fe₂Al₅

↑ STEADY STATE
  EQUILIBRIUM

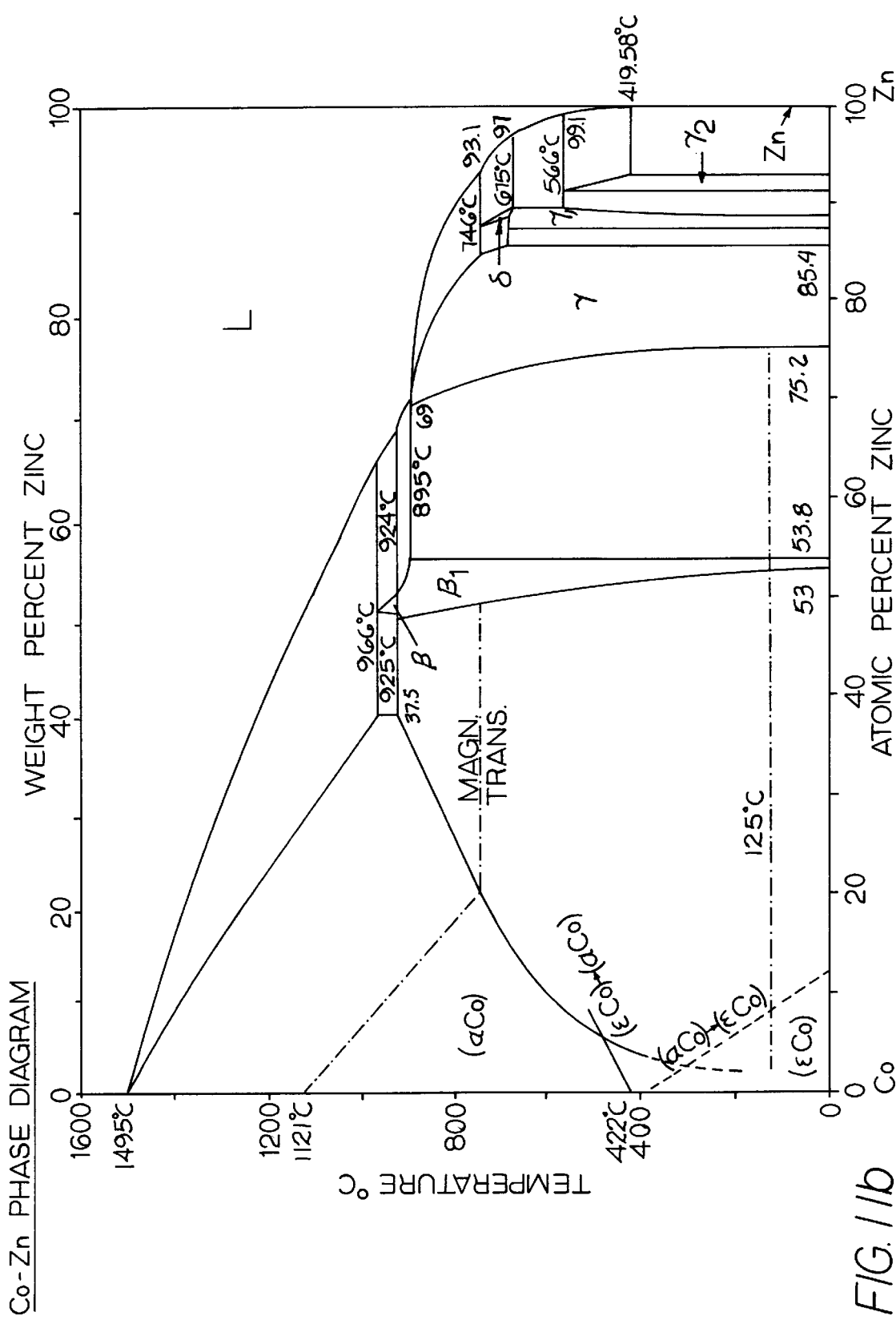

MATERIAL FORMULATION FOR GALVANIZING EQUIPMENT SUBMERGED IN MOLTEN AND ALUMINUM ZINC MELTS

CROSS-REFERENCE TO RELATED APPLICATION

This application is a continuation-in-part of application Ser. No. 08/909,117, filed Aug. 11, 1997 for "Material Formulation for Galvanizing Equipment Submerged in Molten Aluminum and Aluminum/Zinc Melts".

BACKGROUND OF THE INVENTION

Galvanized steel utilized in the automotive, construction and appliance industries is formed in very thin strips (0.015 to 0.060 inch thick), which are passed through a molten bath of either zinc (galvanizing), aluminum (aluminizing), or aluminum/zinc (galvanneal, galfan, galvalume, etc.), in which the levels of aluminum vary from a fraction of a percent to as much as 100 percent.

The "hot dip" metalizing coating process requires equipment that runs submerged in the molten metal. The molten metal temperature usually varies from as low as 820° F. to as high as 1300° F.

A heated metal pot contains a bath of molten zinc/aluminum. A continuous moving strip of low carbon steel is introduced into the bath from a furnace in the conventional manner. The strip passes around a sink roll and tensor rolls while submerged in the bath, so the surface of the strip picks up a zinc/aluminum coating. The strip is delivered to the bath through a conventional tubular snout. The interior of the snout housing contains an inert gas such as nitrogen or a mix of nitrogen and hydrogen. This procedure, as is well known to those skilled in the art, is useful in preventing the steel strip from oxidizing.

Because of the extremely large dimensions of the equipment and in spite of efforts to prevent all possible air leaks into the furnace, small leaks do occur, generating ferrous oxides ($Fe_2O_3$.FeO, etc.) When the steel strip enters the bath, a chemical process occurs in which the melt in the bath reacts with the iron in the steel strip (inducing the coating) but also reacts with the oxides to form dross that contains ZnFe, ZnAlFe, ZnFe+$Al_2O_3$, etc. The free iron settles to the bottom of the molten metal pot. Because of the slightly or nearly identical density to the molten metal, the oxides ($Al_2O_3$, ZnO) and the intermetallics formed (ZnFe, ZnAlFe, etc.) remain in suspension or float to the surface in the form of dross. The dross increases its concentration by being nearly entrapped in the zone comprised by the snout, the strip, the sink roll and the tensor rolls, where it gradually forms deposits on top of the sink roll and the strip being processed.

Outline of Requirements for Galvanizing Equipment

Standard rolls and equipment used in the hot dip metalizing process, when the alloy melt is zinc or zinc/aluminum with aluminum concentrations of less than 60%, are made of 316-L stainless steel. The rolls and bearings, in particular, require continuous maintenance of their surfaces. The rolls are removed weekly from the pot and their surfaces machined to remove accumulated dross, to smooth the roll surfaces as well as to return them to a round and straight condition. The main reason for this continuous maintenance is because 316-L stainless steel is not a material formulated specifically for this application and, consequently, it lacks the properties to meet the operational needs.

In order of importance, although all requirements must be met to a minimum degree, the properties required for a proper roll material that meets the operational needs are as follows:

1. Very low solubility in molten zinc or zinc/aluminum alloys. In other words, $$O = S < 4 \times 10^{-5} \text{ in/hr}$$

Where S=the amount of roll radial loss due to molten metal dissolution.

2. Low adhesion (non-wettable) to zinc/iron and zinc/iron/aluminum dross. Wetting plays the main role in the bonding of solid-liquid state metals.

3. High surface hardness ($R_c$ larger than 40). Abrasive wear contributes nearly half of the loss of roll life in metalizing applications.

4. Dimensional stability at operating temperatures up to 1300° F., for straightness and roundness. This property is necessary because of the difficulties encountered when the lines operate at over 100 RPM, generating excessive vibration and damage to the holding equipment.

5. Thermal shock resistance. The roll should be capable of withstanding a thermal shock of no less than 500° F. when going from air to the molten metal, and 1300° F. when going from the molten metal to air.

6. Good impact and notch resistance strength. This is important due to the severity of the application.

7. Centrifugally castable and machinable by standard procedures in order to provide simple and available maintenance.

8. Economic viability.

The following expands, in corresponding order, each of the material properties required to meet the listed operational needs.

Evaluation of Specification Requirements

In order to obtain a material formulation that is capable of having a dissolution rate of $$O = S < 4 \times 10^{-5} \text{ inches/hour}$$

It is important to understand the interaction of dissimilar metals in solid-liquid states. The joining of dissimilar metals in a solid-liquid state is governed by their physio-chemical properties and by the interaction between them; or, in the case of more complex systems, such as super alloys, by their interaction with all other alloying elements and impurities. When the melting point of the corrosive metal (the coating alloy in our case) is much lower than that of the metal being attacked (the roll material), the roll material may remain in a solid state throughout the process. In this case, a strong metallic bond between the atoms of the coating metal and the roll material occurs in the wetting process. It is true, however, that other associated processes can significantly influence the attack rate and kinetics of solubility, i.e., dissolution, interdiffusion and formation of intermetallics that have a significant effect on the bonding properties of the intermetallic layers being formed.

Experimental as well as theoretical findings have shown that the attack on a solid metal by zinc and zinc/aluminum alloys is a topochemical reaction in which a two-stage formation of strong bonds between atoms of the two materials is a characteristic feature.

In the first stage, a physical contact is established by the close proximity of the two metals allowing interaction between the atoms. The electrostatic interaction between the surface atoms is of great importance at this stage.

In the second stage, the chemical interaction takes place and the formation of a strong bond is completed. At this stage, quantum processes between the electrons prevail. Thus, the occurrence of electron interaction of different types of materials requires a definite quantity of energy for surface activation. This energy, in the case of "hot dip" metalizing is imparted in the form of heat retained in the molten metal that is maintained at temperatures well above their melting temperature in order to improve the coating capability of the melt alloy in accelerated production. In other words, the lower the temperature of the melt in the pot, the slower the two basic stages of alloying formation.

During galvanizing and aluminizing, both stages as well as the subsequent diffusion take place so fast that it is difficult to join zinc/aluminum to steel without the formation of brittle intermetallic layers at the contact zone. Zinc/aluminum alloys are so active that adhesion and diffusion into steel is achieved even in the presence of a passive film of iron oxides, as long as the oxide layer is no thicker than 100 Å (see FIG. 1).

In order to improve the resistance of ferrous alloys to molten aluminum, it is necessary to study the dissolution process that follows wetting in detail. The dissolution of solid ferrous alloys into molten aluminum has been studied by M. Kosaka and S. Minowa (Transactions Iron & Steel Institute of Japan, Vol. 50 and 52, 1964.) It is also theoretically described by Nernst-Shchukarev's equation $$dc/dt = K_s A/V \cdot (C_s - C_i) \quad (1)$$

where $C_i$=the instantaneous concentration of the dissolved metal in the melt (weight percent)

$C_s$=the saturation concentration at operational temperature (weight percent)

$K_s$=the dissolution rate constant (or mass transfer coefficient)

A=the surface exposed to the Zn/Al melt

V=the volume of the melt

From this equation and assuming the dissolution of the solid metal is controlled by mass transfer into the molten metal, the rate in weight loss of a roll submerged in the molten alloy is expressed by the equation $$-dw/dt = K_s A (C_s - C) \quad (2)$$

Where t=time $K_s$=dissolution rate constant

A=roll surface area exposed to the melt $C_s$=saturation concentration of the melt at the operating temperature in weight percent C=instantaneous concentration of the weight dissolved metal in the melt in weight percent w=the weight of the roll Since in a coating line the melt alloy is being added continuously, it can then be accepted that C=0 (or approximately zero)

Then, $$-dw/dt = K_s A C_s \quad \text{or} \quad (3)$$

$$K_s = \frac{dw/dt}{A C_s} = \frac{V dc/dt \, \delta}{A C_s}$$

δ: Density of the Material  (4)

In other words, the dissolution of the roll material into the melt depends on two elements:

a. $C_s$—A coefficient, independent of time, whose value can be obtained from the concentration of the liquidus curve at the operating temperature in the phase diagram for each of the components of the roll material (see FIGS. 3 and 4).

$$\frac{dc_s}{dT} > 0$$

$$\frac{dc_s}{dT} < 1 \times 10^{-2} \; 1/°C.$$

b. $K_s$—A coefficient, dependent on time, that establishes the kinetics of dissolution of each one of the component elements of the super alloy roll material (see FIGS. 6a and 6b).

Utilizing metals or transition metals with a $C_s$ equal to 0 at the operating temperature of the melt, obtains a non-wetting, zero-solubility alloy for operation in the alloy melt. Unfortunately, only two such materials exist for zinc, namely, tungsten and carbon. Only one exists for aluminum, carbon.

It has then been necessary to study the dissolution coefficient, $K_s$, for metals and transition metals, and its change with changes in operating temperatures, velocity, etc. (N. Tunca, G. W. Delamore and R. W. Smith) (Metallurgical Transactions Association, Vol. 21A, November 1990) and to establish its variation in value for binary and ternary alloys (V. R. Ryabov) (Aluminizing of Steel, Oxonian Press Pvt Ltd N.D.)

Due to the large quantity of experimental data needed and the scarcity of it, an attempt has been made to establish a correlation between the theoretical values of the dissolution coefficient, $K_s$, with the existing experimental values (Mitsuo Niinomi and Masamichi Sano). (Dissolution of Ferrous Alloys into Molten Aluminum, Transactions of the Japan Institute of Metals, Vol. 23, No. 12) Unfortunately, it was established that the kinetics of dissolution of metals and transition metal alloys in zinc/aluminum melts do not follow the Nernst/Shchukarev equation. The differences of the coefficients $K_s$ obtained should be attributed to:

a. The mechanism of dissolution (static, natural convection dynamic, etc.).

b. The relationship to the appearance and growth peculiarities of the intermetallic phases formed at the interface of the solid and liquid metals. The growth of these intermetallic phases in zinc/aluminum alloy melts, as discussed earlier, is extremely fast. Their growth decreases the dissolution rate, and with $C_s$ and A values constant, the value of $K_s$ must decrease with time below the theoretical value (see Equation 3). Finally, the dissolution process changes to an intermetallic layer/alloy melt diffusion controlled process. This occurs when the critical thickness of the intermetallic layer is reached and dissolution reaches equilibrium (see FIGS. 1a–1f, 6a and 6b).

Additional studies were conducted using V. G. Levich's equation in order to enter into consideration the rotational velocity of the roll (See FIGS. 6a and 6b).

$$dc/dt = 0.62 \ S/V \ D^{2/3} v^{-1/6} w^{1/2} (C_s - C_i) \qquad (5)$$

where $C_i$=the concentration of additive $C_s$=the saturation concentration t=the time S=the surface area of the specimen V=the volume of the aluminum/zinc melt D=the diffusion coefficient V=the kinematic viscosity w=the angular speed of rotation Equation 5 at t=C=0 and w=1 may be used to theoretically evaluate the diffusion of metals in molten metals. This effect was partially initiated and conducted with some degree of correlation by T. Heumann and S. Dittrich. (Z. Metallkunde, Vol. 50, 1959, p. 47–617).

A fourth approach undertaken to analyze the behavioral change of the diffusion coefficient utilizes the Stokes-Einstein formula. The difference between the coefficient obtained by the theoretical calculations with that reduced from experimental tests utilizing the theoretical formulae differ in value by 10 to 20 times, even though the techniques used in determining the coefficients in most cases were almost the same.

Perhaps the most valuable information is that derived from the following facts:

a. Aluminum and zinc do not attack or wet most oxides, carbides or nitrides.

b. At steady-state equilibrium, $K_s$ is no longer a variable function of time ($K_s$=f(t)) but a constant.

c. The investigations (V. R. Ryabov, Alitirovanie Stali, Chapter IV, Metalurgiya Publishers Moscow) on how the addition and concentration of other elements to iron affected the diffusion zone, and formation of intermetallics and change in the dissolution rate, lead to the following conclusions:

Carbon

The structure of iron-carbon alloys formed by slow cooling from the γ-solid solution region is well known. Only the nature and the properties of the diffusion zone developed when immersing the prepared alloys in aluminum as a function of temperature, duration and the percentage of carbon content were studied.

With an increase in carbon content from 0.2 to 0.56% the thickness of the intermediate layer varies (FIG. 8a) insignificantly at both 750° and 850° C. (from 110 to 125 and from 90 to 110 μm respectively). The layer has greater solubility at 850° C. and is, therefore, thinner, increasing the mass transfer rate.

The microstructures showed the presence of an irregular, tongue-shaped intermediate layer (see FIGS. 7a–7f).

Since aluminum decreases the solubility of carbon in liquid and solid iron, carbon is forced out from the solid solution of iron during formation of the intermediate layer and an area rich in carbon develops immediately in front of the diffusion zone (see area labeled 3 in FIG. 7f).

This happens, because carbon, unlike iron and aluminum, cannot penetrate through the intermetallic layer. Carbon is deprived of its solvent and aluminum travels deeper into the specimen and pushes carbon ahead of itself; nonetheless, carbon retards the dissolution of iron by acting like a barrier to the aluminum diffusion progress.

Aluminum may be partially combined with carbon forming either $Al_4C_3AlC_3$ carbides or $Fe_3AlC_x$ carbide. The microhardness of the intermediate layer showed little dependance on the carbon content in the alloy. It should be noted that the structure of the layer changed with an increase in carbon content in the alloy. This can be explained by the change in the structure of steel from purely ferritic to pearlitic.

In the interaction of aluminum with iron, when the latter has a body-centered cubic lattice α-Fe, the diffusion layer is always jagged towards the iron side (FIG. 7f). In the case of interaction of aluminum with iron or an alloy containing iron in a face-centered cubic, γ-Fe, the diffusion layer has smooth boundaries.

Nickel

The maximum nickel (and chromium) content in the alloys were the same as in stainless steel to examine the effect of each percentage element individually.

Nickel belongs to the group of those elements forming a continuous series of solid solutions with iron. Introduction of nickel into iron widens the γ-Fe region. Nickel has a low $C_s$ in zinc, but it is very high in aluminum; and its addition is equivalent to an increase in temperature of the alloy melt (see FIGS. 17a and 17b).

The thickness of the intermediate layer significantly changes with an increase in the nickel content in the steel substrate from 1.92 to 12% at 750° as well as at 850° C. The thickness of the intermediate layer decreases rapidly from 70–100 μm (1.92% Ni) to 10–14 μm (8.5% Ni), afterward increasing as the nickel is increased up to 12% (see FIG. 8b). The intermediate layer is smooth along the thickness without tongues.

X-ray analysis of the phase composition of joints of aluminum with steel alloyed with nickel, established that the quantity of the intermetallic phases $Fe_2Al_5$ decreases with an increase in nickel concentration in steel. Thus, in the specimens with 1.92% Ni, a wide intermediate layer of $Fe_2Al_5$ phases was detected, whereas, in the specimens with 8.5% Ni contents, this phase was negligible.

Chromium

Chromium belongs to the group of alloying elements, which narrow the γ-region. The chosen chromium content and the aluminizing temperature do not alter the region of phase changes, as seen in the iron-chromium phase diagram (FIG. 15).

Thus, the diffusion zone, formed in aluminizing, varied only as a function of the chromium content in the substrate alloy, temperature and duration of aluminizing. The thickness of the intermetallic zone is almost independent of the temperature but increases rapidly (80 μm to 140 μm) with an increase in chromium content from 2.20 to 7.2% and decreases when chromium reaches 12.4% to 75 μm (FIG. 9a).

The thickness of the intermetallic layer ($Fe_2Al_5$ phase) decreased when alloyed with chromium also, but to a much lesser extent than when alloyed with nickel. Thus, the $Fe_2Al_5$ phase with 7.2% Cr is about the same as in unalloyed steels. The thickness of the intermetallic layer ($Fe_2Al_5$ phase) decreased only in the alloys containing more than 10% Cr.

Manganese

Manganese is one of the alloying elements which widens the γ-region, behaving very much like nickel. A continuous series of solid solutions does not appear in a solid state in the iron manganese system. Diffusion of manganese in α- and γ-iron is more difficult than the diffusion of carbon. The alloys prepared cross only through α- and α+γ-region during aluminizing.

As seen in FIG. 9b, the thickness and hardness of the intermetallic zone, formed in aluminizing, decrease with an increase in manganese content in the steel substrate thus increasing the dissolution rate and the dissolution coefficient, $K_s$.

Silicon

Although silicon belongs to those elements which narrow the γ-region, it behaves in a more detrimental manner than nickel because of its high $C_s$ in aluminum and the reduction of aluminum's melting temperature as the silicon percentage increases to 12.6% at the eutectic ratio (FIGS. 18a and 18b). The silicon content was chosen so that only the γ-region was covered at the aluminizing temperatures. No other phase changes occurred in the alloys during aluminum immersion. Thus, the pattern of the diffusion zone formed during aluminum immersion depended upon the silicon content in the alloy, aluminum melt temperature, and time the specimens were held in liquid aluminum.

An additional problem with silicon is that it does not generate carbides at the standard processing temperatures, as do vanadium, tungsten and molybdenum; so, its use in resistant alloy formulations should be excluded.

Silicon, if added to the aluminum bath, has a greater effect than increasing its content in steel. An increase of silicon in either the bath or steel reduces the hardness and thickness of the diffusion layer to the same extent. With an increase of silicon in steel, the silicon content in the diffusion layer increases.

Boron, Titanium, Vanadium and Molybdenum

Boron very strongly narrows the γ-region. There are only two mechanisms by which a crystal can dissolve atoms of a different element: interstitial and substitutional. Boron and carbon are the only elements with atoms small enough to fit into the interstices of iron crystals. The other small-diameter-atom elements, such as oxygen, hydrogen and nitrogen, tend to form compounds with metals instead of dissolving in them. The addition of these atoms (boron and carbon) creates a strong increase in the crystal's internal energy, strengthening the alloy and reducing its solubility in zinc/aluminum melts.

Phase changes in iron-titanium alloys set in only above 900° C. An introduction of titanium in iron strongly narrows the γ-region.

Vanadium and molybdenum drastically limit the γ-region. No phase changes took place at aluminum immersion temperatures tested with the selected molybdenum and vanadium content in the alloys (FIG. 9c).

Component Elements Selection Criteria

Thus, all the elements which increase the thickness of the diffusion layer and reduce the mass transfer rate narrow the field of the γ-modification in the iron alloying element phase diagram. The elements acting in the opposite manner widen the γ-region. This occurs because the diffusion rate of different elements in the α-modification of iron with a bcc (Body-centered cubic) structure is greater than in the γ-modification, with an fcc (Face-centered cubic) structure (V. R. Ryabov and V. D. Duplyak, 1968). (Protective Coatings on Metals, Naukova-Domka Kiev No. 5, p. 89–94).

Alloying elements which narrow the γ-region at the process temperature favor the γ-α transformation of iron at small concentrations of aluminum, thus increasing the overall depth of diffusion. The effect of this phase change, the variation of the lower limit of dissolution of aluminum in α-iron by the alloying elements, is overlapped by the effect of the added alloying elements on the rate of diffusion of aluminum in each of the modifications of iron and also by the change of the upper limit of dissolution of aluminum in iron. The combined effect of these facts determines the relationship of the depth of aluminum penetration to the content of the alloying elements. This is clearly seen when alloying iron with manganese, which reduces the thickness of the diffusion layer only on the basis of widening of the γ-region in the Fe—Mn system, accelerating the corrosion attack.

From the kinetics formation of the diffusion layer and the growth thickness and properties of the intermetallic layers between solid-liquid phases, it can be concluded that if a metallic alloy must be formulated to resist zinc/aluminum melts, it should meet the following requirements:

a. The components of the alloy should have the lowest saturation concentration possible, i.e., $1\% > C_s = 0$ at the metalizing operating temperature (see FIGS. 2–5).

b. The alloying elements must narrow the γ-Fe region, and their percentage content should be such that only the γ-region is covered at the coating operational temperature.

c. The intermetallic layer thickness formed during molten zinc/aluminum immersion at steady-state conditions should not be less than $1.2 \times 10^2$ μm.

d. Elements that reduce the melting temperature of either zinc or aluminum should not be used as components of the melt resistant alloy (FIGS. 18a and 18b). In other words, $$1 \times 10^{-2} 1/°C. > dc_s/dT \geq 0$$

e. The formation of strong covalent bonded molecules of the type $M_xC_y$ should be promoted to generate a microstructure rich in hard and steady carbides, resistant to molten zinc/aluminum, having tough complex matrix structures.

f. Maximization of the carbides to matrix ratio should be secured by proper selection of the carbon ratio to carbide forming elements, thus, also assuring a reduction of the exposed effective area (Equation 3).

Based on the preceding studies and conclusions, the optimum components for materials to be used in a zinc/aluminum alloy melt should be: boron, carbon, cobalt, chromium, molybdenum, niobium (columbium), titanium, vanadium, tungsten and zirconium (FIGS. 2, 3, 4, 5, 11a, 11b, 12a, 12b, 13a, 13b, 14a and 14b). Despite the fact that chromium does not show optimum $C_s$ values with aluminum in its phase diagram, it has been included because of the excellent percentage of chromium carbides that can be generated during processing ($Cr_{23}C_6$). Nickel, iron and cobalt necessary to form the solid solution matrix and increase thermal shock and impact resistance, on the other hand, must be used with great discretion. In FIGS. 17a and 17b, the nickel/zinc diagram shows a low $C_s$. On the other hand, it's use is extremely detrimental in the presence of even moderate quantities of aluminum, since it not only has a high $C_s$, but reduces the melting temperature of aluminum.

This is similar to silicon that acts equivalently to an increase in the aluminum temperature, accelerating the corrosion attack. For this reason, the percentage of nickel used in a zinc/aluminum melt resistant alloys should decrease with increases of percentage of aluminum in the melt, and its replacement by cobalt or iron will show a beneficial reduction in the mass transfer rate by the formation of $F_3C$ and $CO_3C$ during processing. The reason for avoiding the use of iron with low percentages of aluminum is because of its high $C_s$ in zinc (FIG. 16b)—for cobalt, its extremely high price.

The second requirement for a roll material requires it to be non-wettable to a zinc/iron or zinc/iron/aluminum dross. Surface phenomena as stated earlier plays a decisive role in the formation of strong bonds (J. A. Morando, U.S. Pat. No. 5,338,280, Columns 1 and 2). Published data on the subject is scarce or non-existent. Although some efforts have been made, especially by V. R. Ryabov, ("Aluminizing of Steel Alloys Oxonian Press, 1985, pages 1–7, 61–83). The latter has devoted considerable effort toward understanding the kinetic relationship of steels and iron wetting with aluminum and zinc, establishing the fact that the spreading rate increased with increase in temperature as well as the activation energy required.

Data and analyses performed by J. A. Morando strongly suggest that the work of adhesion of metals and transition metal alloys decreases with increases in the surface hardness and a reduction of surface energy of the adhesion resistant alloy. This is due perhaps to the fact that the surface hardness of the resistant alloy is a consequence of the concentrations of low surface energy carbides (WC, MoC, VC, etc.) present on the roll surface.

By formulating a material based on the restraints of the selected criteria, the mass transfer rate is reduced with the increase in complexity of the intermetallic layer and with a decrease in the bonding strength of the diffusion layer, as a consequence of the minimization of matrix exposure and reduction of exposed effective area. The carbides' surface coverage makes the dross adhesion by mechanical action less likely, since the strip running through the roll surface can easily remove it before it can build up to a detrimental thickness that affects the quality of the coating finish.

In testing performed with very high percentages of aluminum (50% to 60%), this principle of dross attachment to the roll was corroborated. The roll whose material was formulated as suggested in this patent application was allowed to run for a period of 45 hours. In that period, the thickness of the dross accumulated in the zone in contact with the steel strip built up to nearly 0.125 inch thick. The portion of the roll not in contact with the steel strip showed no dross build-up whatsoever. The test was repeated while the submerged roll surface was being periodically scraped through a mechanical device. The roll continued to operate in excess of 120 hours before the dross build-up accumulated to 0.125 inch thick. In other words, the bond strength of the diffusion layer of the zinc/aluminum alloy to the roll material was so weak that it could be removed by simple mechanical means and with it the zinc/iron/aluminum dross that had mechanically locked itself to it.

Surface Hardness

A high surface hardness ($R_c$ larger than 40) is necessary. This is a mechanical requirement imposed by the fact that the roll surface is acting as the bearing surface for the steel strip being processed, and sliding friction between the two will occur during operation. The wear caused by this sliding friction can be greatly reduced if the material hardness is above $R_c40$. One of the many reasons for the poor performance of 316L stainless steel is the fact that it cannot be scraped to remove melt dross due to its very soft surface. On the other hand, if it could have been removed, it would fail even faster due to abrasive wear. 316L surface hardness is approximately $R_c10$ and highly inadequate.

The materials formulated in accord with the selection criteria, because of the high carbide densification and distribution as well as the toughness of the solid solution matrix that contains them, have shown excellent dimensional stability at temperatures up to 1600° F. Roundness of rolls removed from the melt at operating temperatures up to 1380° F. was within $1\times10^{-3}$ inches total indicated reading. On the other hand, 316L stainless steel, as well as any other stainless steel materials, because of the interaction of nickel/chrome/iron and the change in phases when subject to temperatures above 600° F. show poor geometrical stability and tend to deform.

Thermal shock resistance and impact resistance, can be achieved by proper utilization of nickel, iron and cobalt necessary to form the solid solution matrix that will contain the carbides as outlined in the discussion of the selection criteria.

Because of the discussions presented regarding nickel's performance in molten aluminum and molten zinc, the following rules should apply:

a) If the aluminum percentage in the melt is:

$$0 \leq Al < 5\%$$

then, the nickel percentage in the melt resistant super alloy should be:

$$10\% < Ni < 30\%$$

b) If aluminum percentage in the melt is:

$$50\% < Al < 100\%$$

then $$Ni=0$$

c) If zinc percentage in the melt is:

$$Zn > 50\%$$

then, $$10\% < Fe < 30\%$$

d) The percentage of cobalt should be based on the balance of the composition needed to maximize the carbide-to-matrix ratio while maintaining the material hardness.

$$40 < Rc < 50$$

Following the preceding general rules will provide a material having good thermal shock resistance, good impact and notch resistance strength and which is centrifugally castable and machinable.

Molten Zinc/Aluminum Resistant Advanced Material Formulation

General Chemical Composition

Taking into consideration all the previous discussions included in this disclosure, we are now in a position to formulate the chemical composition limits of a super alloy material capable of resisting molten zinc/aluminum alloy melts and their drosses.

| %    | Component | %    |
|------|-----------|------|
| 1.0  | < C <     | 5.0  |
| 10.0 | < Cr      | 30.0 |
| 0.0  | ≦ Ni <    | 30.0 |
| 1.0  | < W <     | 15.0 |
| 1.0  | < Mo <    | 10.0 |
| 0.0  | < V <     | 10.0 |
| 0.0  | < Nb <    | 10.0 |
| 0.0  | < Co <    | 20.0 |
| 0.0  | < B <     | 5.0  |
| 10.0 | < Fe <    | 50.0 |
| 0.0  | ≦ Zr ≦    | 6.0  |
| 0.0  | < Mn <    | 5.0  |

Silicon <1; preferably <0.08; more preferably <0.05; most preferably trace. An alternative general chemical composition is as follows:

| %    | Component | %    |
|------|-----------|------|
| 1.6  | < C <     | 2.6  |
| 15.0 | < Cr <    | 30.0 |
| 0.0  | ≦ Ni <    | 30.0 |
| 10.0 | < W <     | 30.0 |
| 2.0  | < Mo <    | 8.0  |
| 0.0  | ≦ V <     | 6.0  |
| 0.0  | ≦ Nb <    | 6.0  |
| 0.0  | ≦ Co <    | 20.0 |
| 0.0  | ≦ B <     | 5.0  |
| 10.0 | < Fe <    | 50.0 |
| 0.0  | ≦ Zr ≦    | 6.0  |

Super Alloy Chemical Composition for Zinc/Aluminum Alloy Melts Containing Less than 5% Aluminum The general chemical composition converts to:

| %    | Component | %    |
|------|-----------|------|
| 1.9  | < C <     | 2.3  |
| 24.0 | < Cr <    | 30.0 |
| 18.0 | < Ni <    | 26.0 |
| 15.0 | < W <     | 25.0 |
| 4.0  | < Mo <    | 8.0  |
| 4.0  | < V <     | 6.0  |
| 0.0  | ≦ Nb <    | 2.0  |
| 0.0  | ≦ Co <    | 6.0  |
| 0.0  | ≦ B <     | 2.0  |
| 18.0 | < Fe <    | 24.0 |
| 0.0  | ≦ Zr <    | 6.0  |

The range of modifications to this chemical composition should be based on the melt's operating temperature which imposes additional restrictions, especially with respect to the thermal shock resistance of the super alloy material under consideration.

Super Alloy Chemical Composition for Zinc/Aluminum Alloy Melts Containing More than 50% Aluminum From all previous discussions, the following chemical composition for the melt resistant super alloy can be derived:

| %    | Component | %    |
|------|-----------|------|
| 1.9  | < C <     | 2.3  |
| 16.0 | < Cr <    | 24.0 |
| 0.0  | ≦ Ni <    | 2.0  |
| 15.0 | < W <     | 25.0 |
| 4.0  | < Mo <    | 8.0  |
| 4.0  | < V <     | 6.0  |
| 0.0  | ≦ Nb <    | 2.0  |
| 5.0  | < Co <    | 15.0 |
| 0.0  | ≦ B <     | 2.0  |
| 35.0 | < Fe <    | 45.0 |
| 0.0  | ≦ Zr <    | 6.0  |

The range of modifications to this chemical composition should be based on the melt's operating temperature which imposes additional restrictions, especially with respect to the thermal shock resistance of the super alloy material under consideration.

Super Alloy Chemical Composition for Zinc/Aluminum Alloy Melts Containing Different Percentages of Aluminum From the general discussions, it will not be extremely difficult to formulate zinc/aluminum melt resistant alloys if a proportional interpolation is conducted. Final optimization of the alloy selected must be performed in a test of actual application, since other variables may exist such as additives used in the alloy melt (silicon, strontium, etc.) which may require slight modifications in the composition, although the principles for the formulation remain.

Economic Viability

The material formulations arrived at in spite of their superior performance to standard materials cannot escape the need for economic viability. The number of special components required in the formulation of the materials under consideration, will translate into a price increase. This price increase can be overcome if the roll designs follow the methods outlined in my patent disclosures:

a) U.S. Pat. No. 5,615,482, issued Apr. 1, 1997, for "Method for Making Composite Centrifugally Cast Furnace Roll";

b) U.S. patent application Ser. No. 08/526,542, filed Sep. 5, 1995 for "Multi-Cast Furnace Roll and Method for Making Same" (pending).

In other words, the roll has a centrifugally cast outside layer made of the melt resistant super alloy (as outlined in this disclosure) and an inner liner of a material having different solubility and hardness characteristics from the outside layer. The object of the utilization of the multicast process, in this case, is that the high hardness and solubility resistance of the outer layer is not necessary throughout the thickness of the roll, that is mostly dictated as a function of mechanical requirements and stress levels.

Experimental rolls made in this fashion, with an outer layer thickness of 0.750 to 1.0 inch and an inner layer thickness of 1.0 to 1.5 inches operating in molten zinc/aluminum melts have shown continuous operation without maintenance three to five times longer than standard materials and a total roll life of six to ten times that of standard materials. Similar performance has been obtained from roll bearings manufactured of materials formulated in accordance with the present disclosure, yet their cost was only 50% to 80% higher than those made of standard roll material.

DESCRIPTION OF THE DRAWINGS

The description refers to the accompanying drawings in which like reference characters refer to like parts throughout the several views, and in which.

FIGS. (1a) to (1f) is a progressive schematic diagram of the interaction of molten aluminum and solid iron.

1 is Diffusion Layer ($FeAl_3$)

2 is Intermetallic Layer ($Fe_2Al_5$)

3 is Carbon plus $Fe_3AlC_x$ Carbides

Figure 1A:
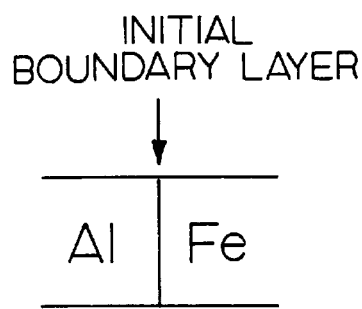
Figure 1D:
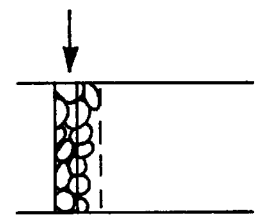
Figure 1B:
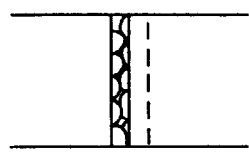
Figure 1E:
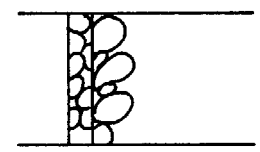
Figure 1C:
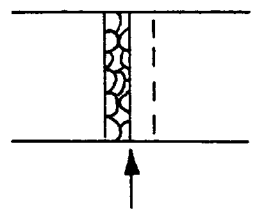
Figure 1F:
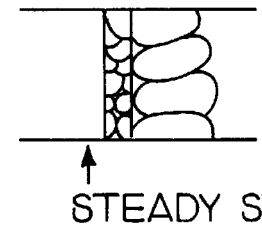
Figure 2:
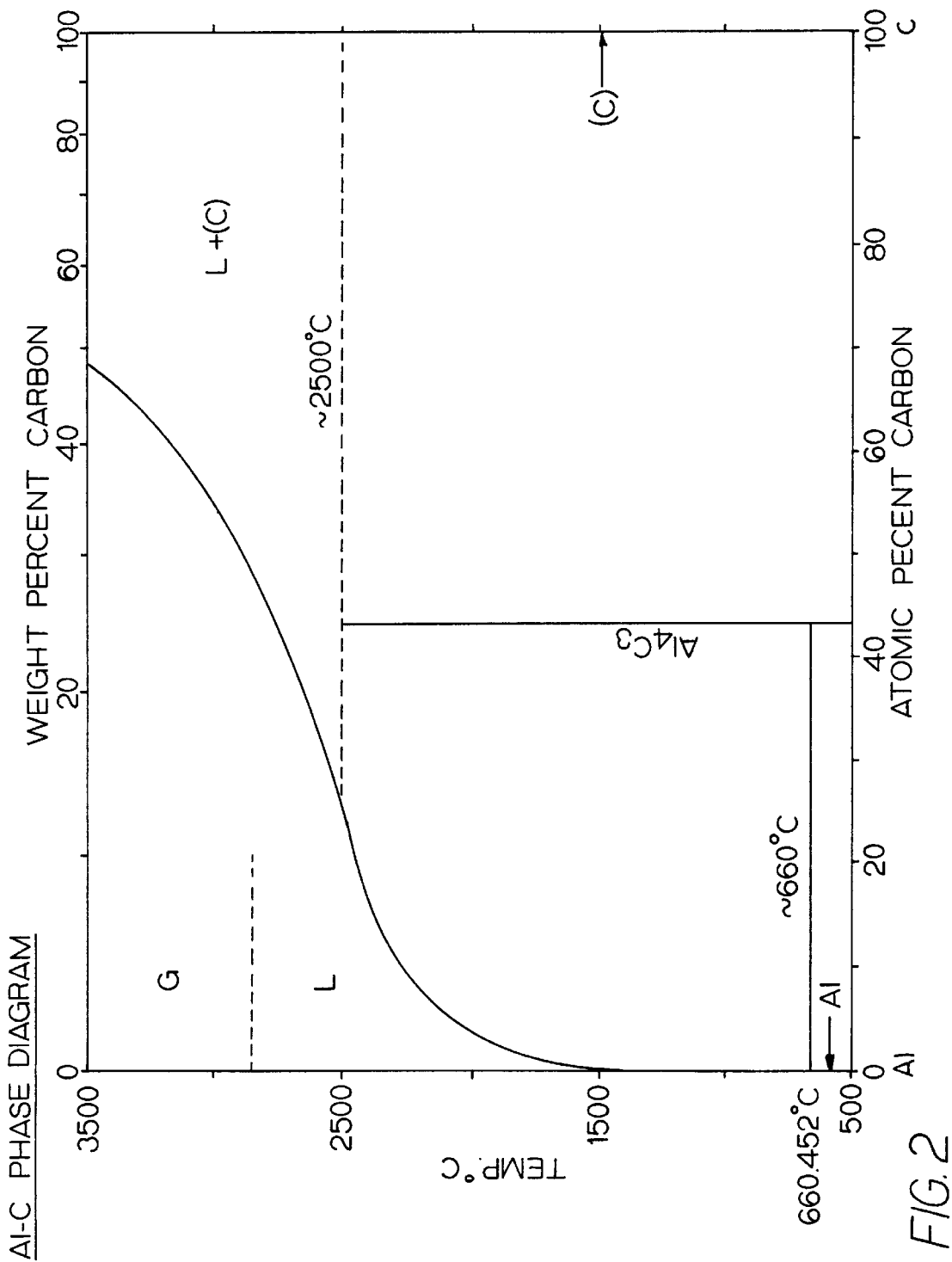
FIG. 2 is the Al—C Binary Alloy Phase Diagram.
Figure 3:
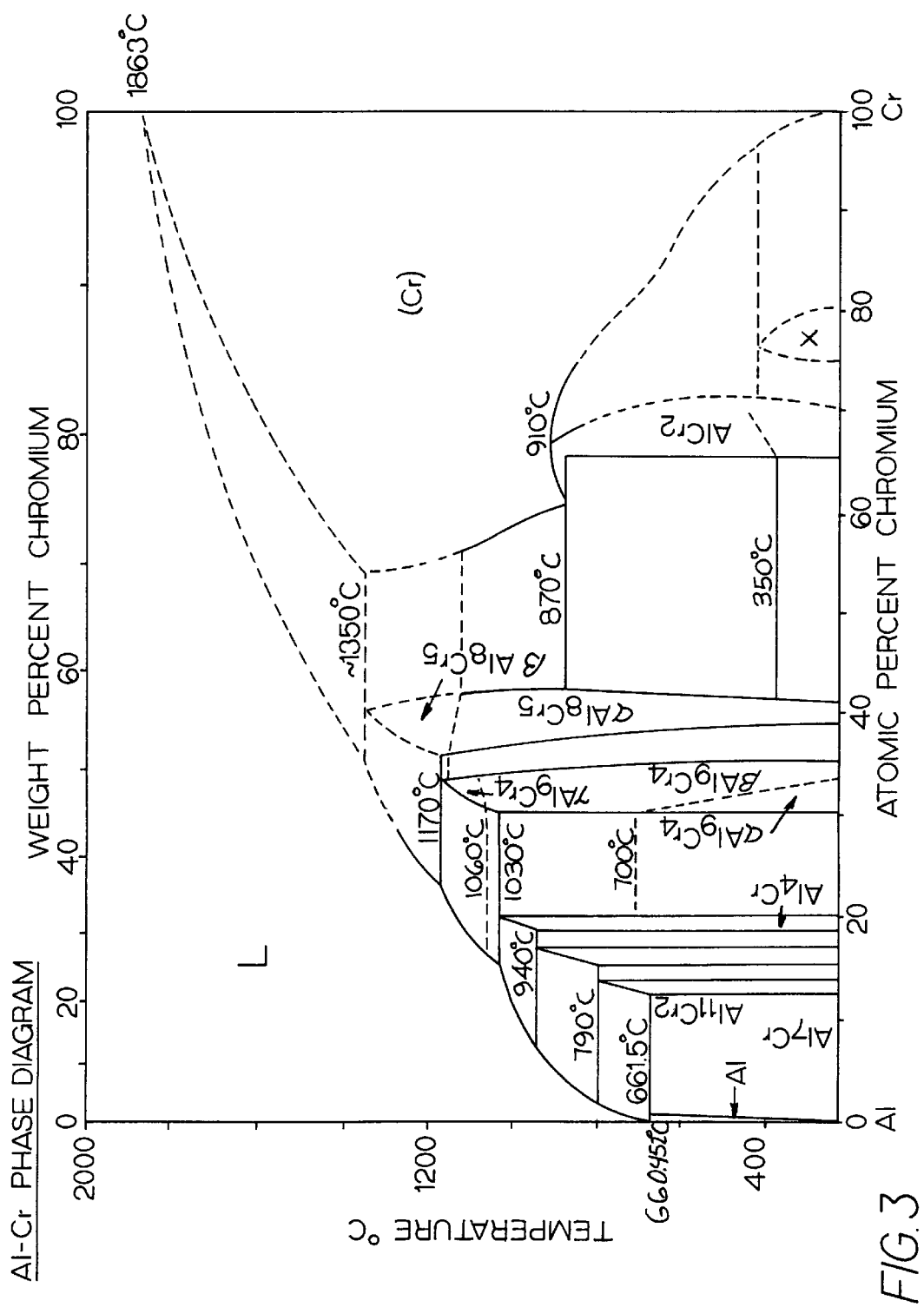
FIG. 3 is the Al—Cr Phase Diagram.
Figure 4:
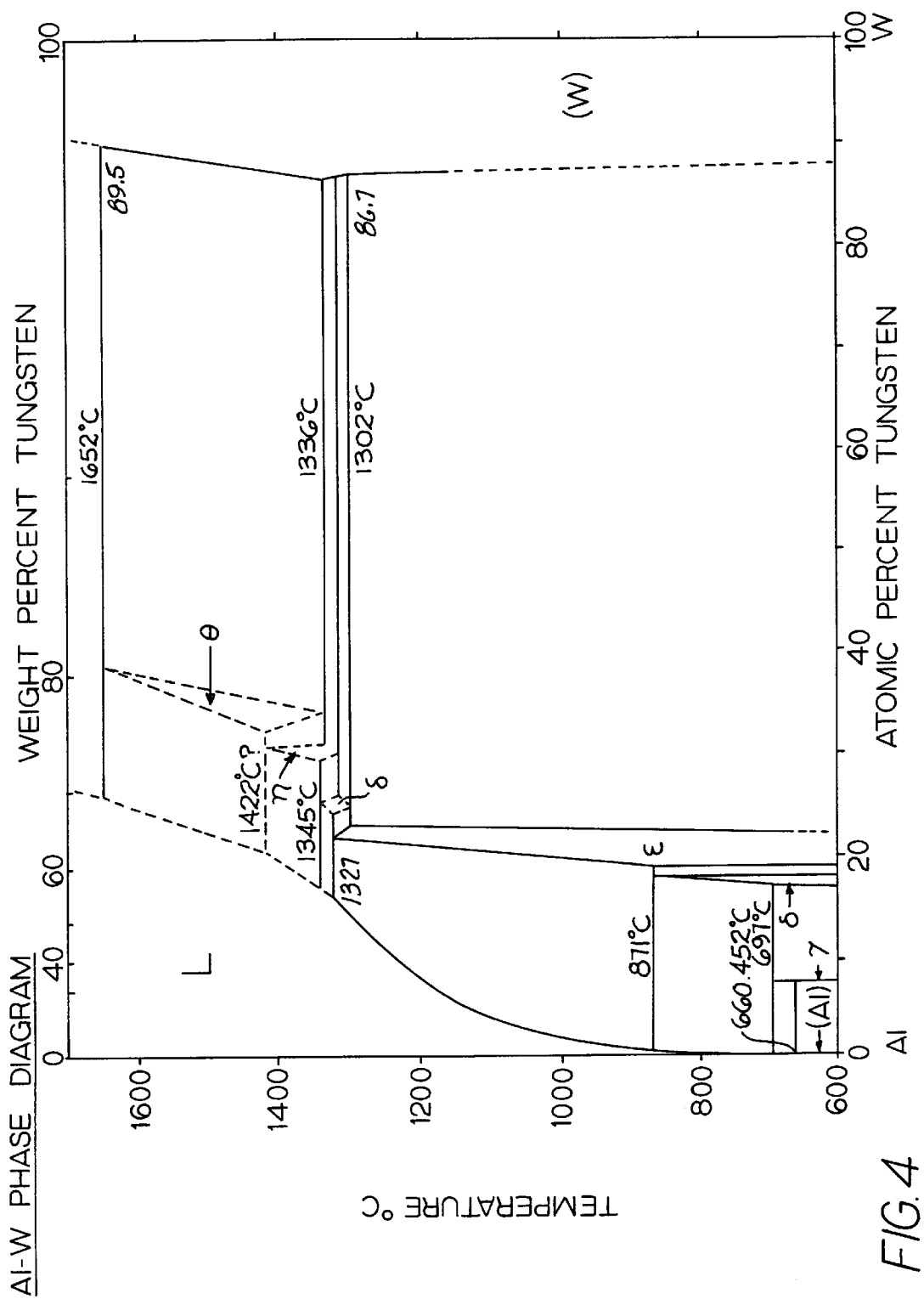
FIG. 4 is the Al—W Binary Alloy Phase Diagram.
Figure 5:
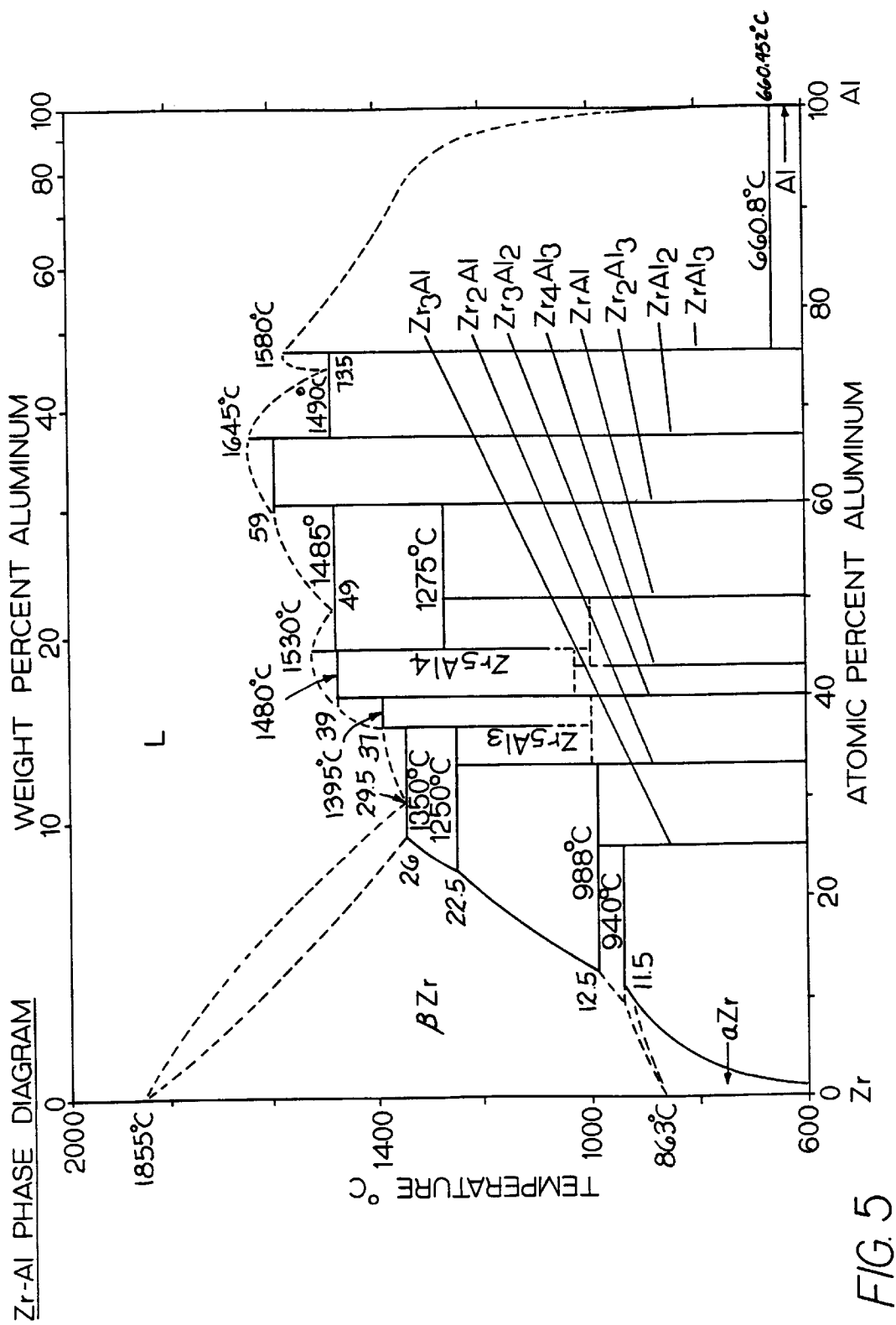
FIG. 5 is the Zr—Al Phase Diagram.
Figure 6B:
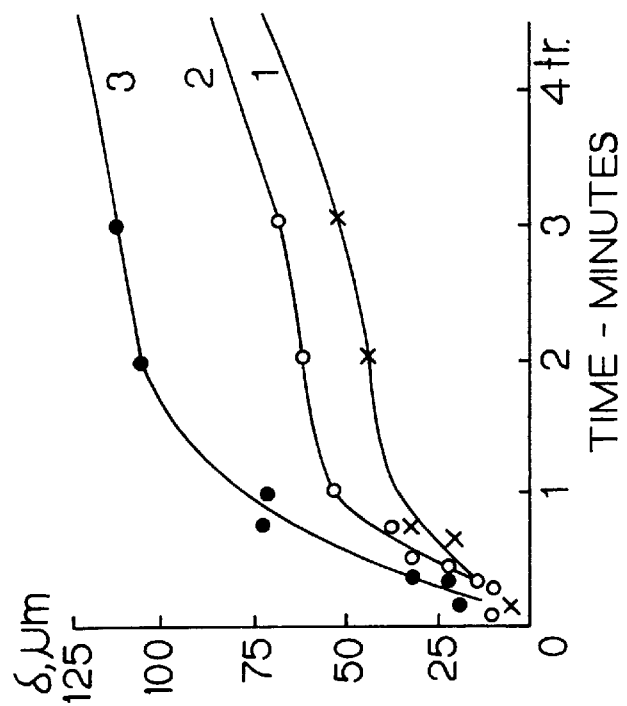
FIG. 6b is a graph showing the variation of the thickness of the diffusion layer with aluminizing time where 1 is 665–670° C., 2 is 690–700° C.; 3 is 740–750° C.
Figure 6A:
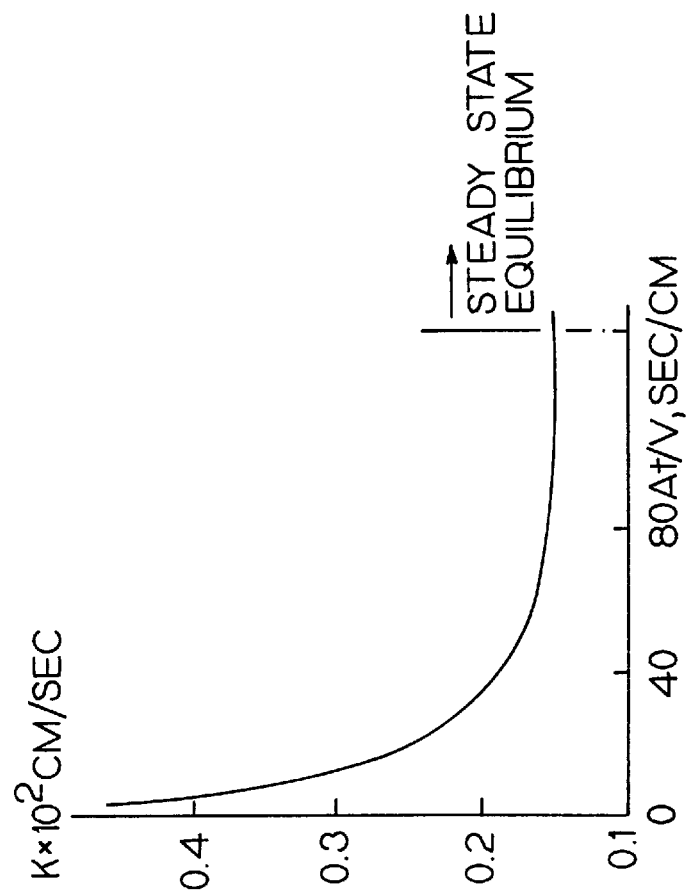
FIG. 6a is a graph showing the variation of coefficient $K_s$ with the specific dissolution rate (At/V) in the dissolution of Armco iron in pure aluminum with 3% Silicon.
Figure 7A:
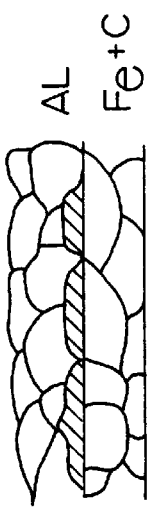
FIGS. 7(a)–7(f) is a progressive diagram showing the nucleation and growth of the intermetallic layer formed in the interaction of aluminum-iron with 0.60% carbon.
Figure 7B:
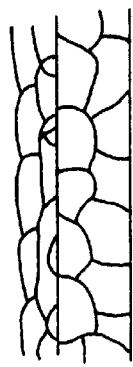
Figure 7C:
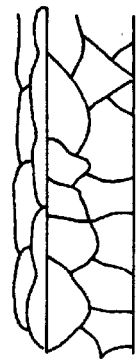
Figure 7D:
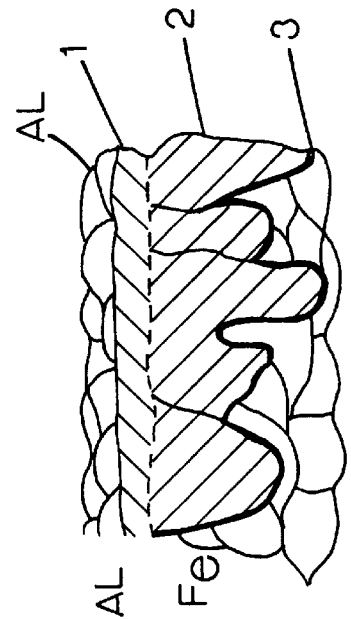
Figure 7E:
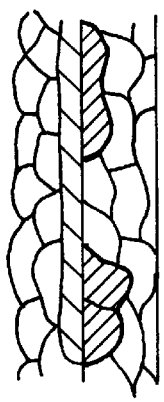
Figure 7F:
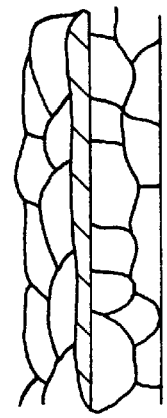

Note the formation of localized super-saturated solid solutions around the defects in crystal structure (FIG. 7a), formation of the first nuclei of the new phase in the defect section with high concentrations of the diffusing element (FIG. 7b), transverse growth of the intermetallic phase nuclei along the plane of the joint (FIG. 7c), closing-in and normal growth of the first continuous intermetallic layer (diffusion layer) (FIG. 7d), formation of early nuclei of the second intermetallic phase with a continuation of normal growth of the first intermetallic layer (FIG. 7e), closing-in of nuclei of second intermetallic phase as a result of transverse growth (FIG. 7f), etc.

Figure 8A:
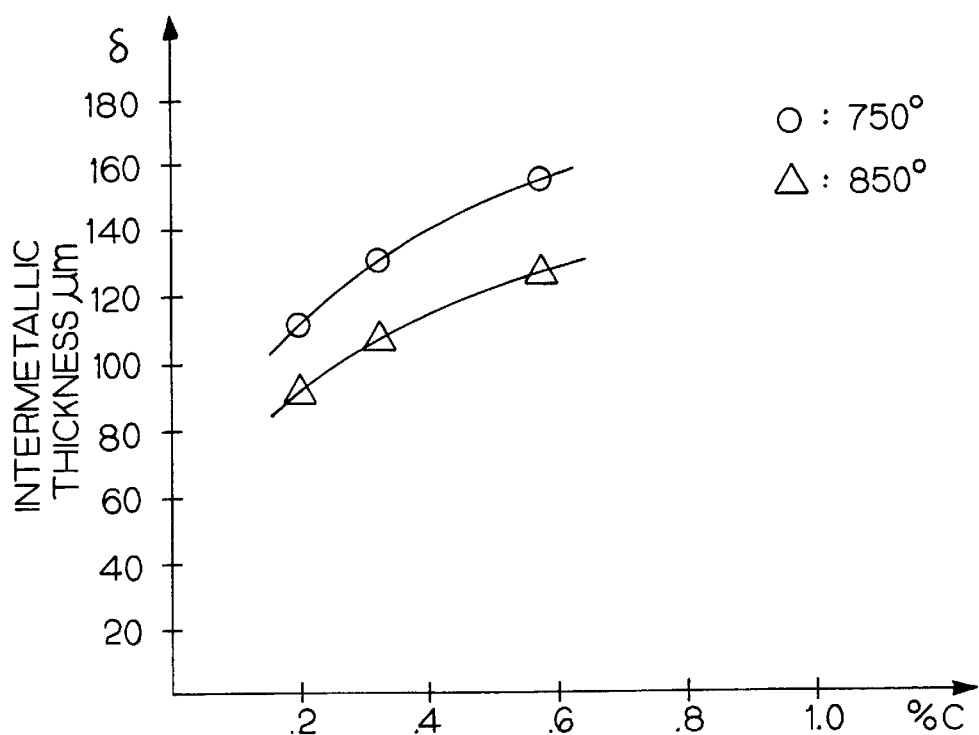
Figure 8B:
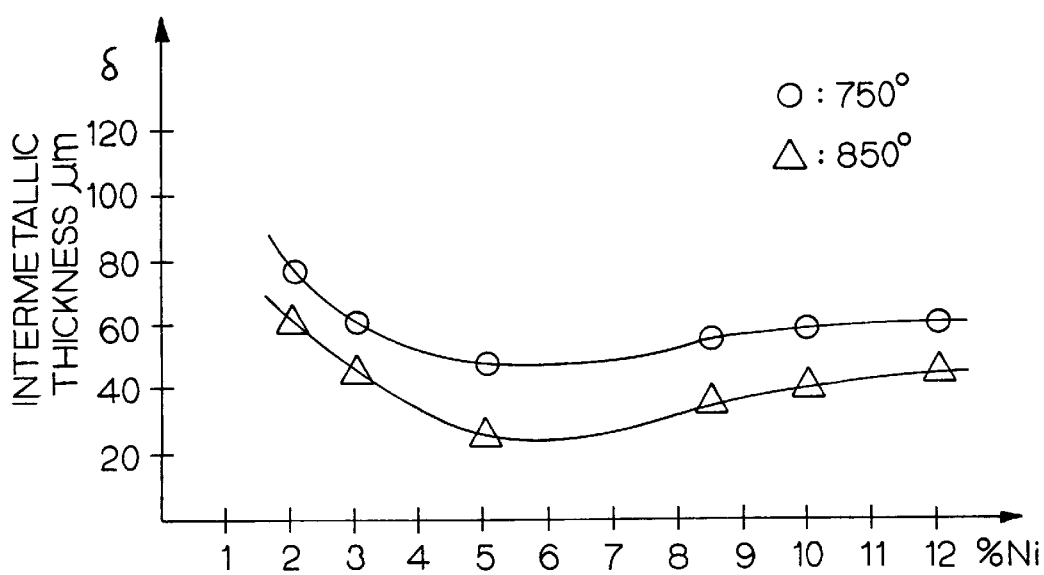
Figure 9A:
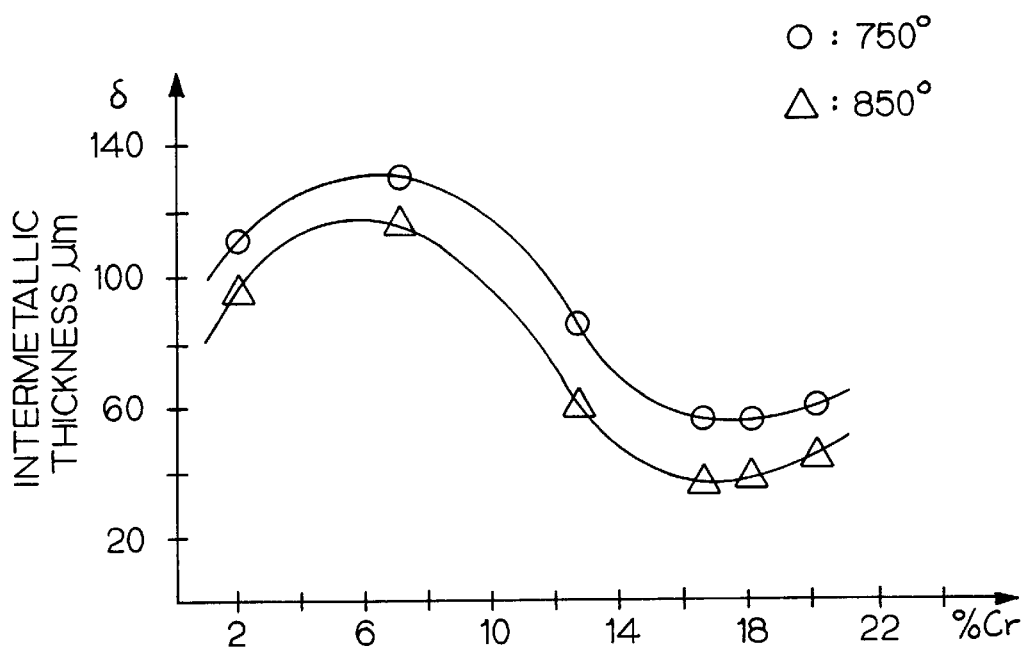
Figure 9B:
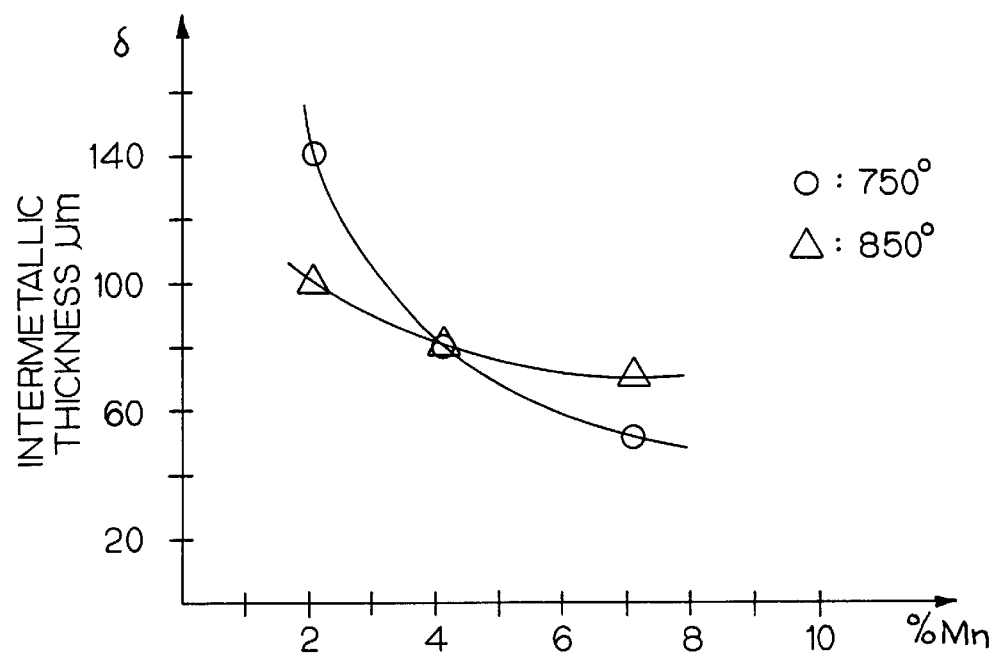
Figure 9C:
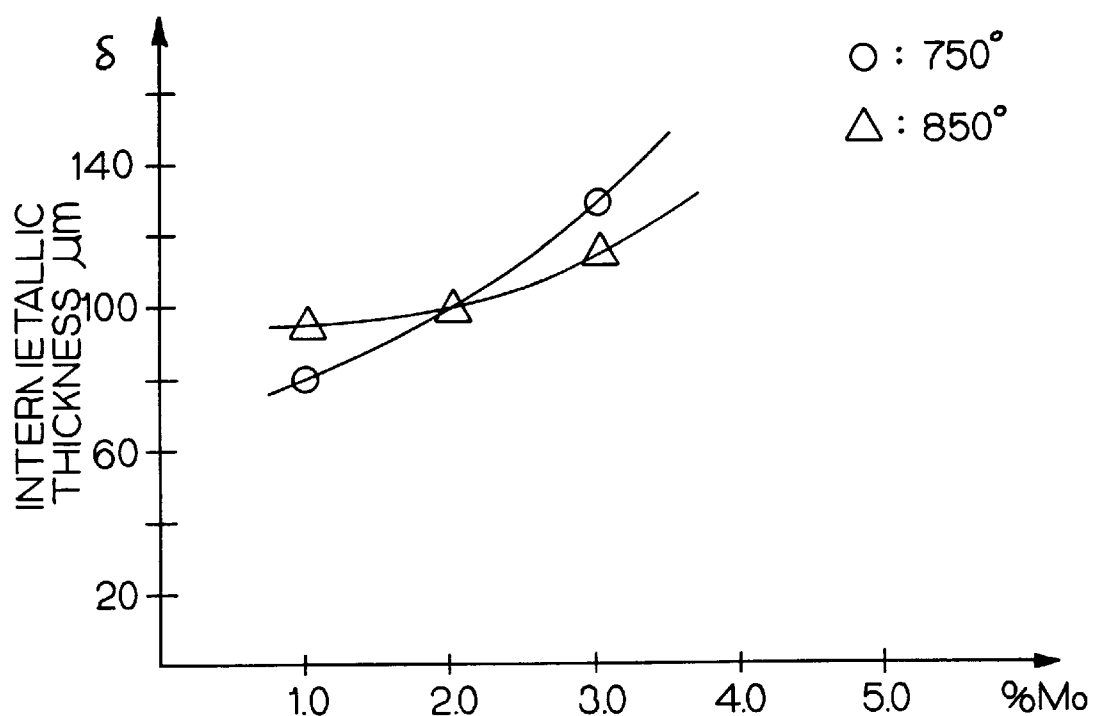
Figure 10A:
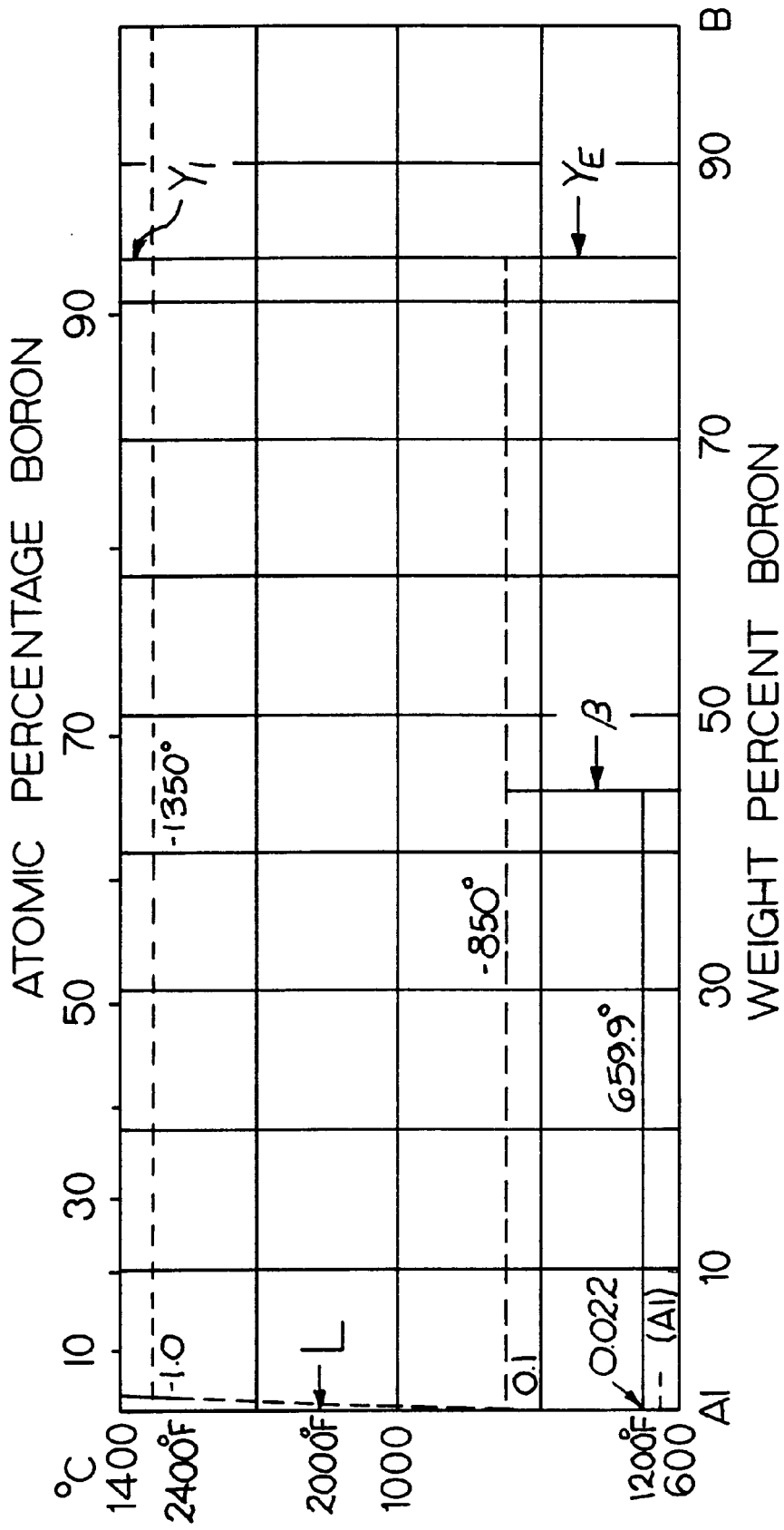
Figure 10B:
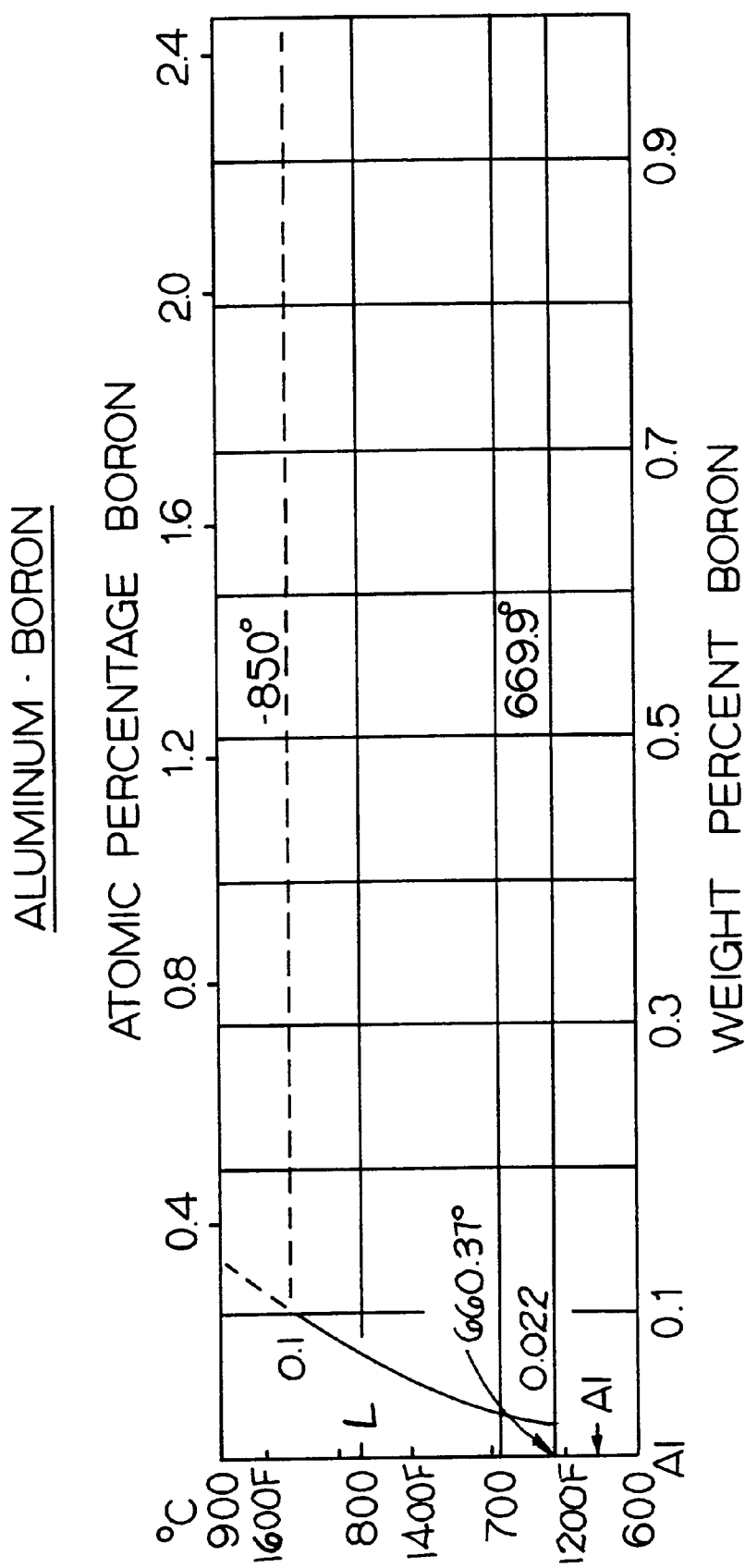
Figure 11A:
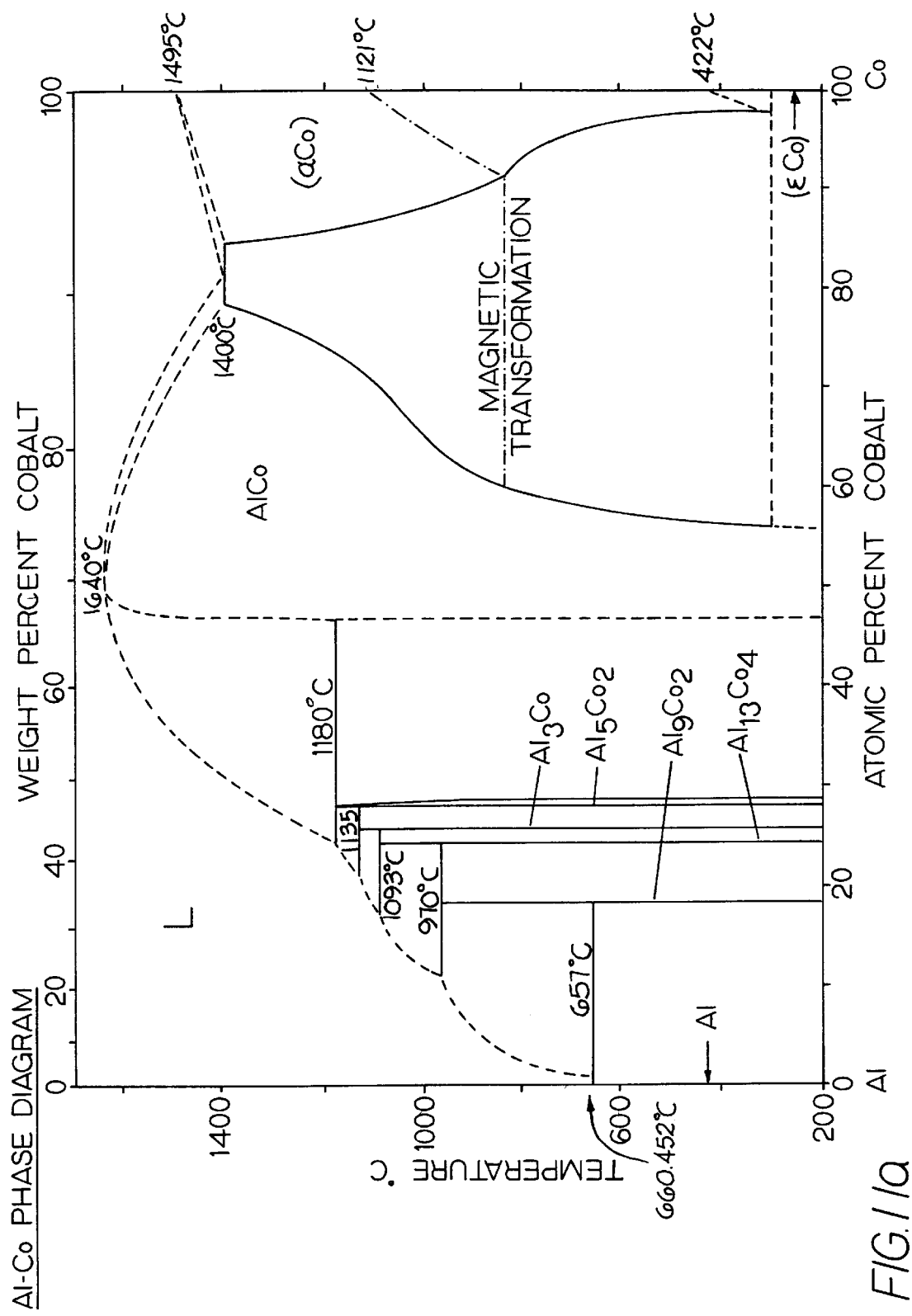
Figure 12A:
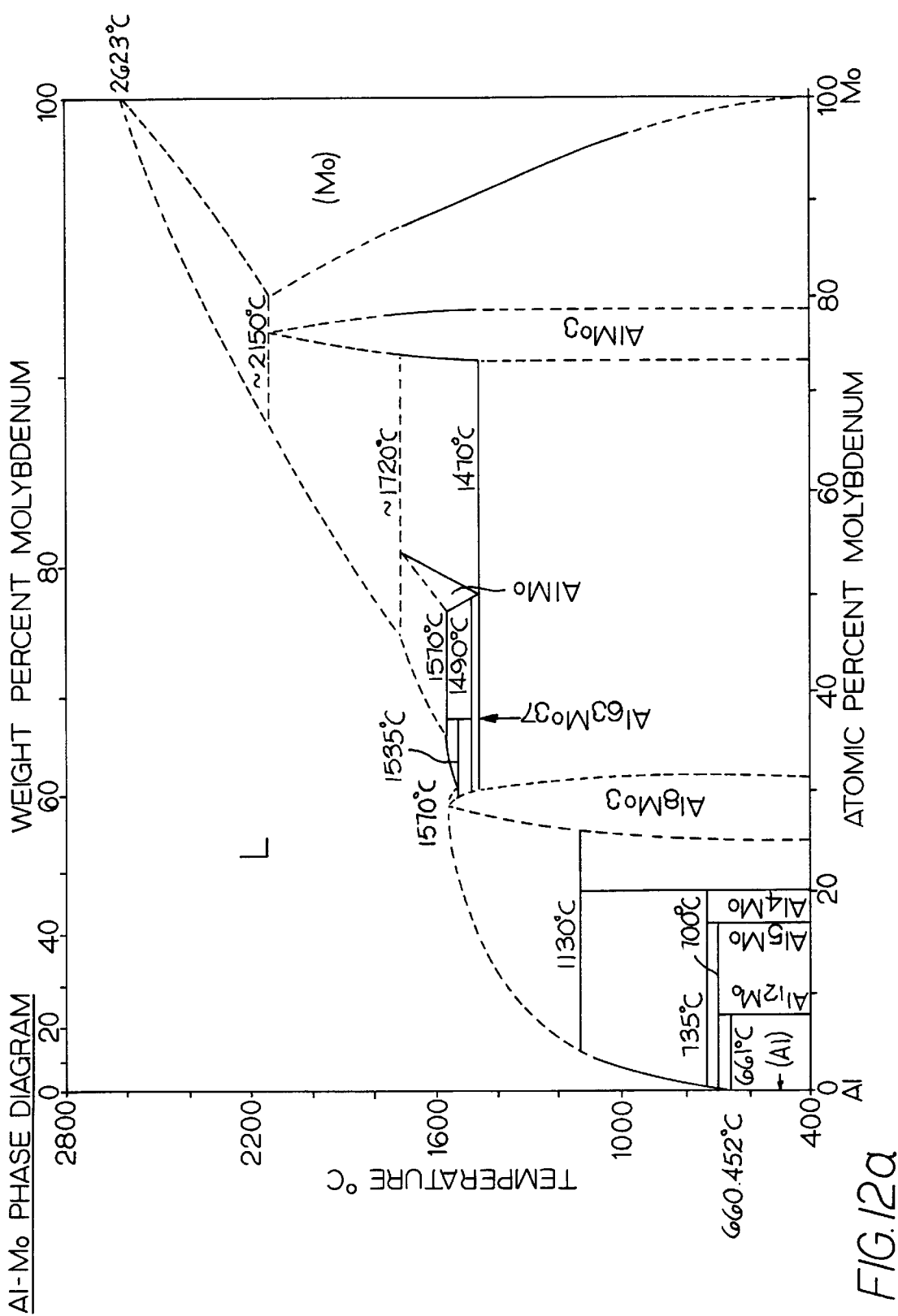
Figure 12B:
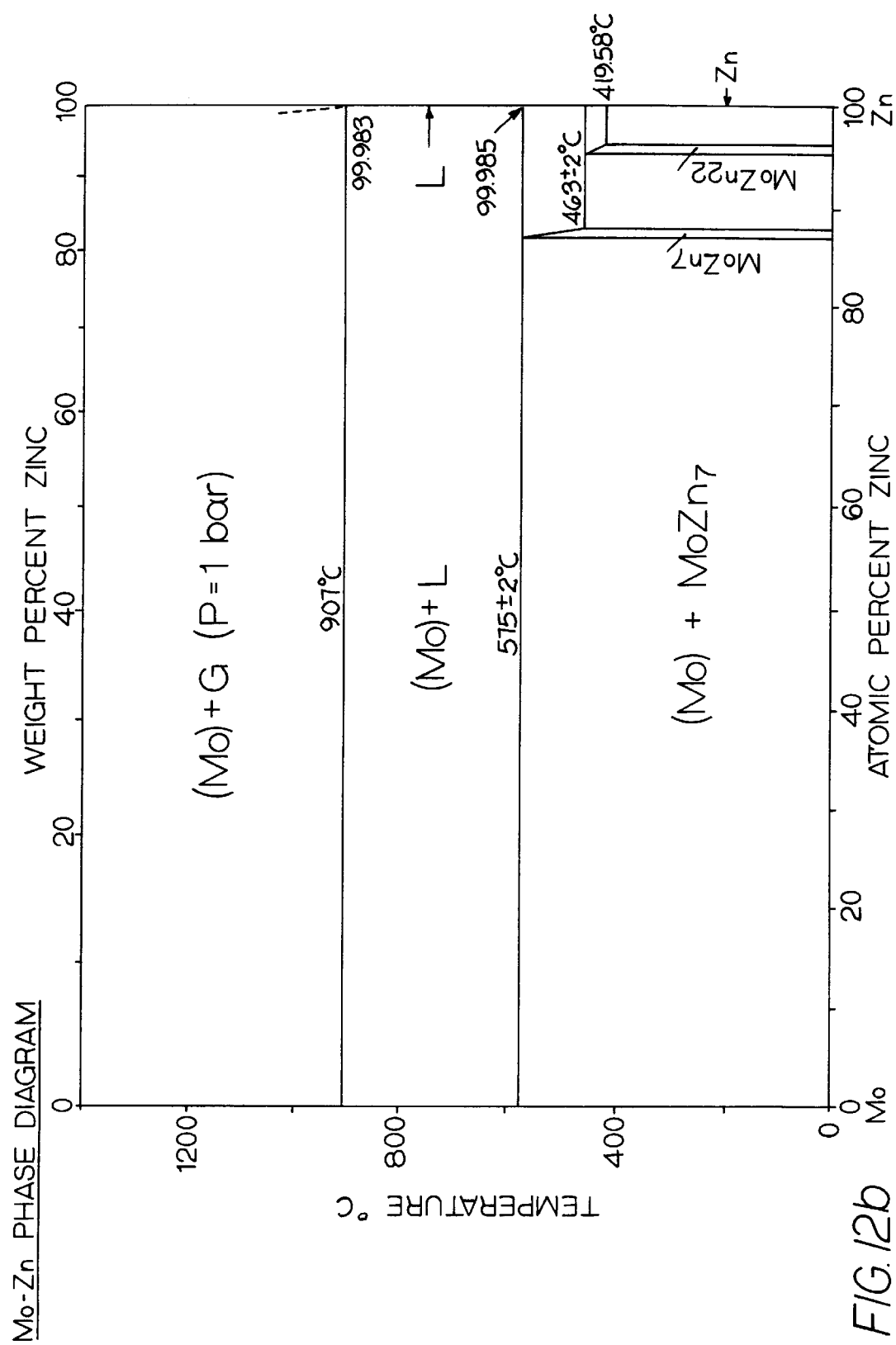
Figure 13A:
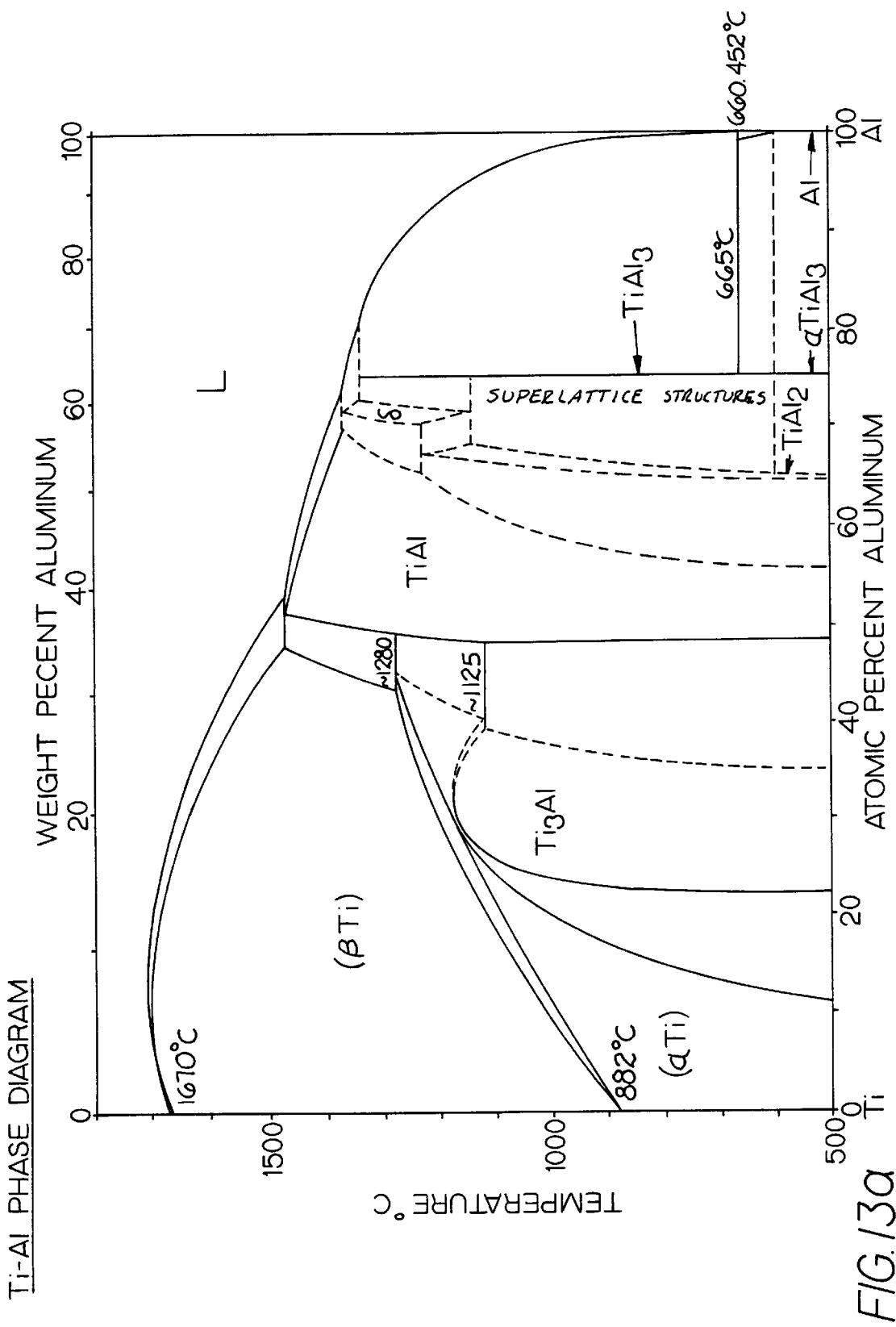
Figure 13B:
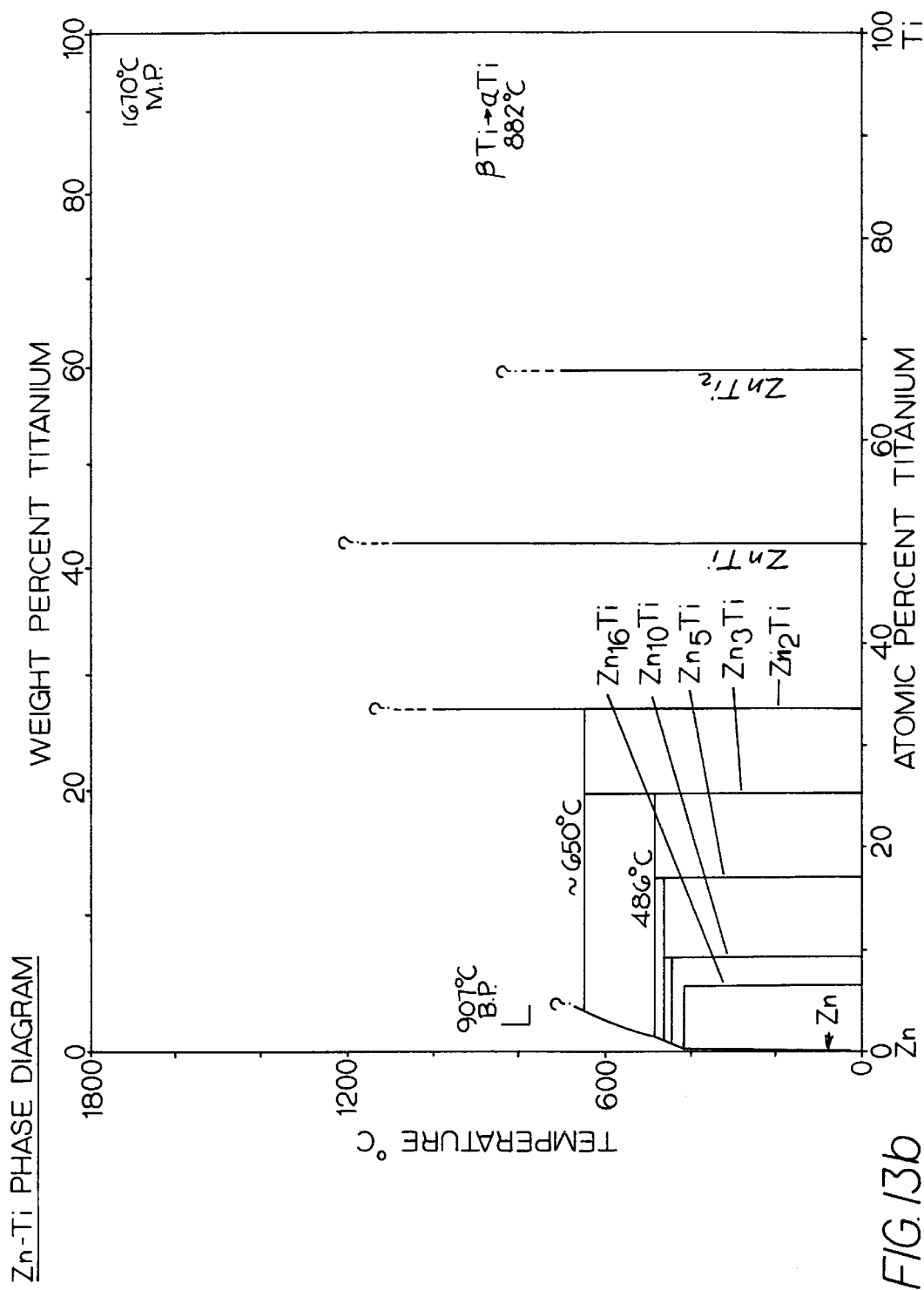
Figure 14A:
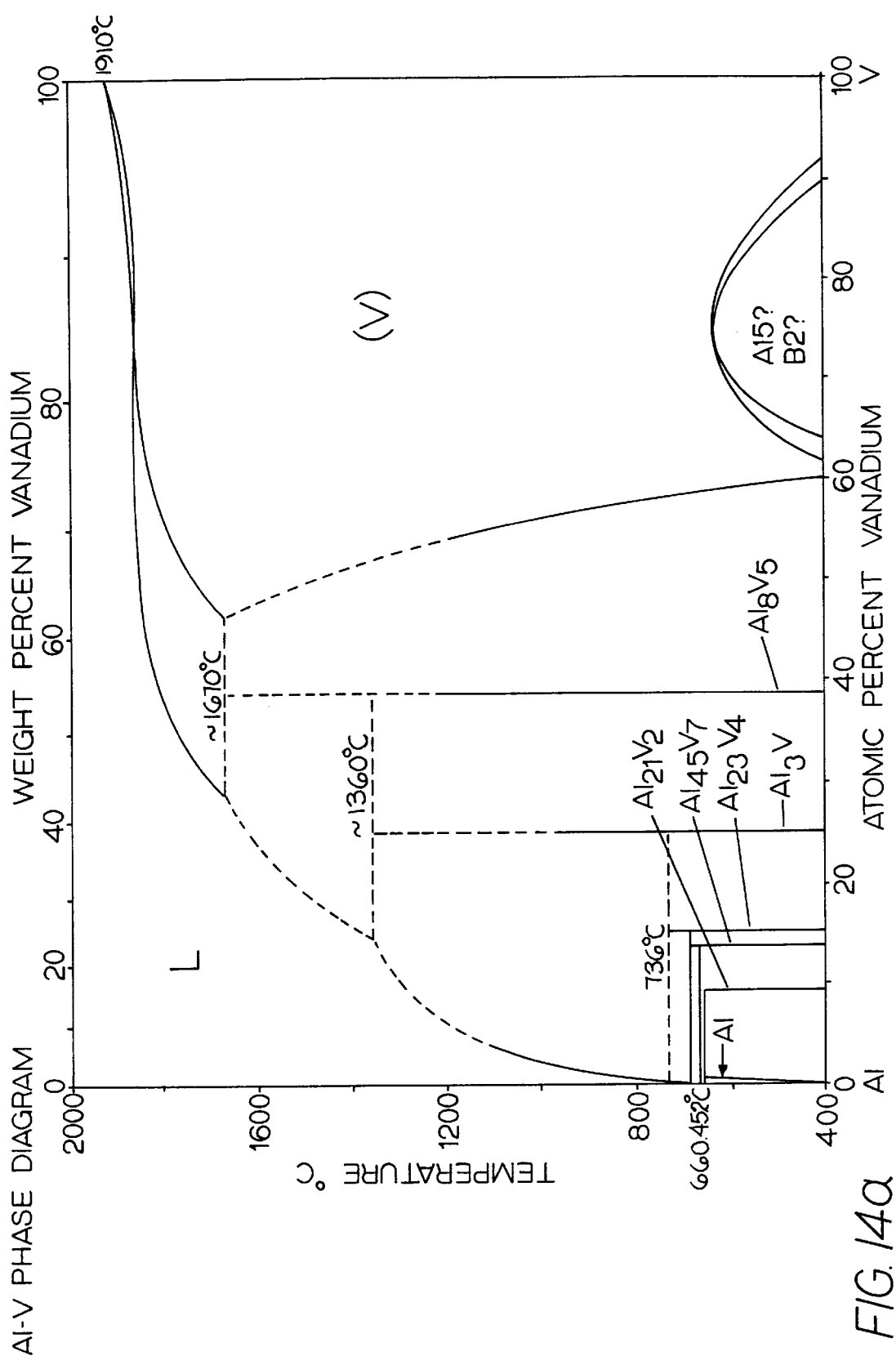
Figure 14B:
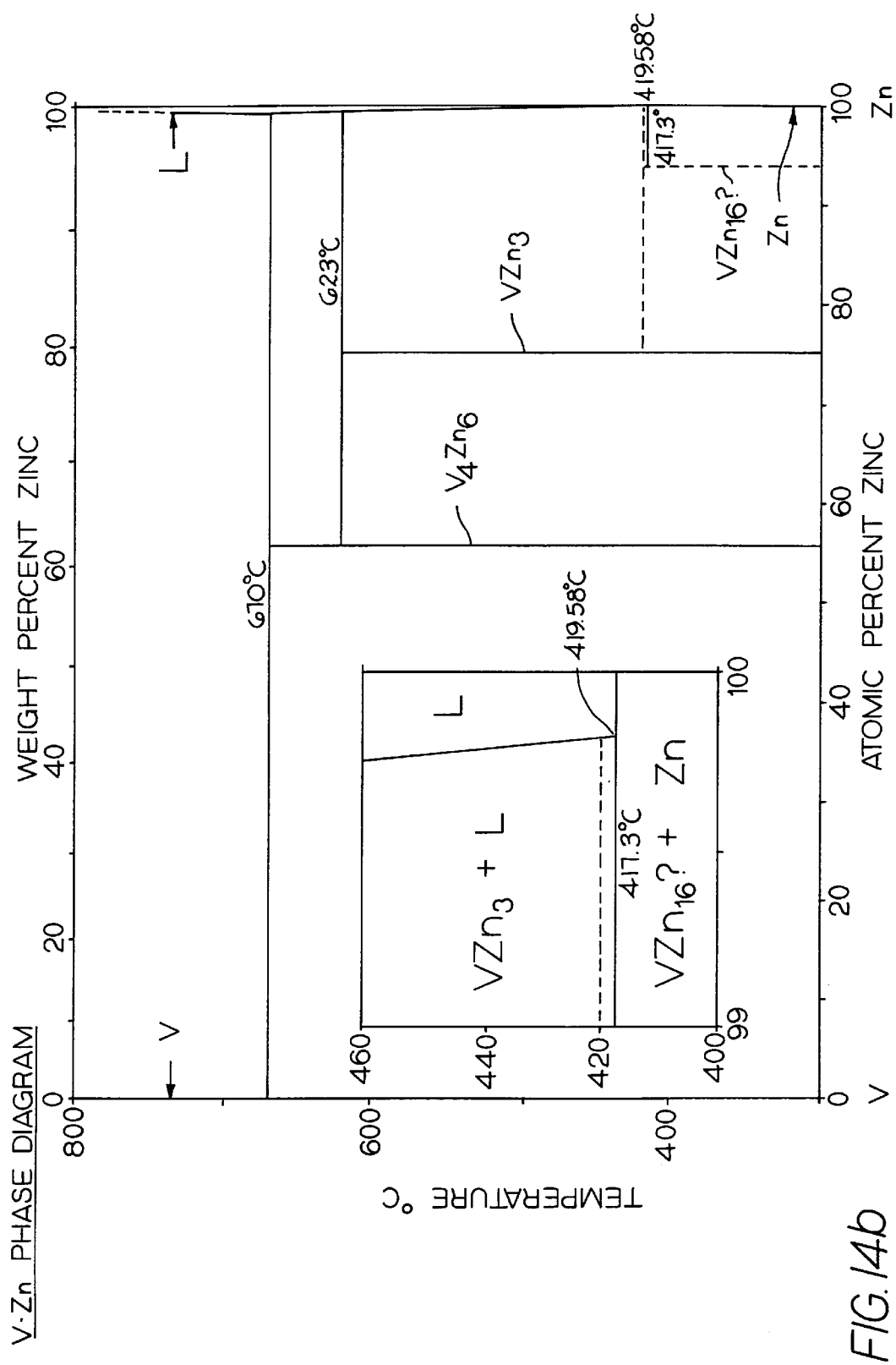
Figure 15:
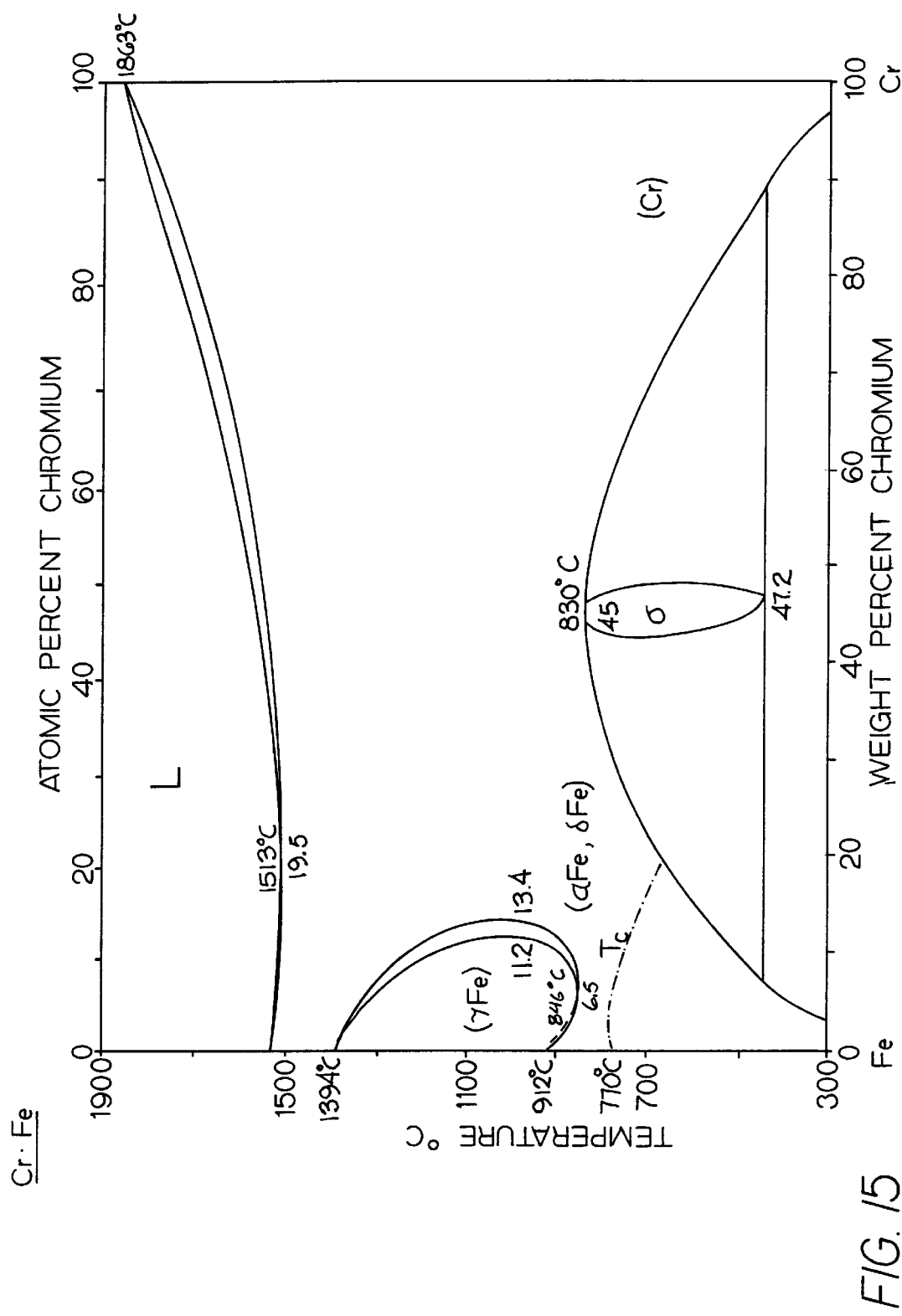
Figure 16A:
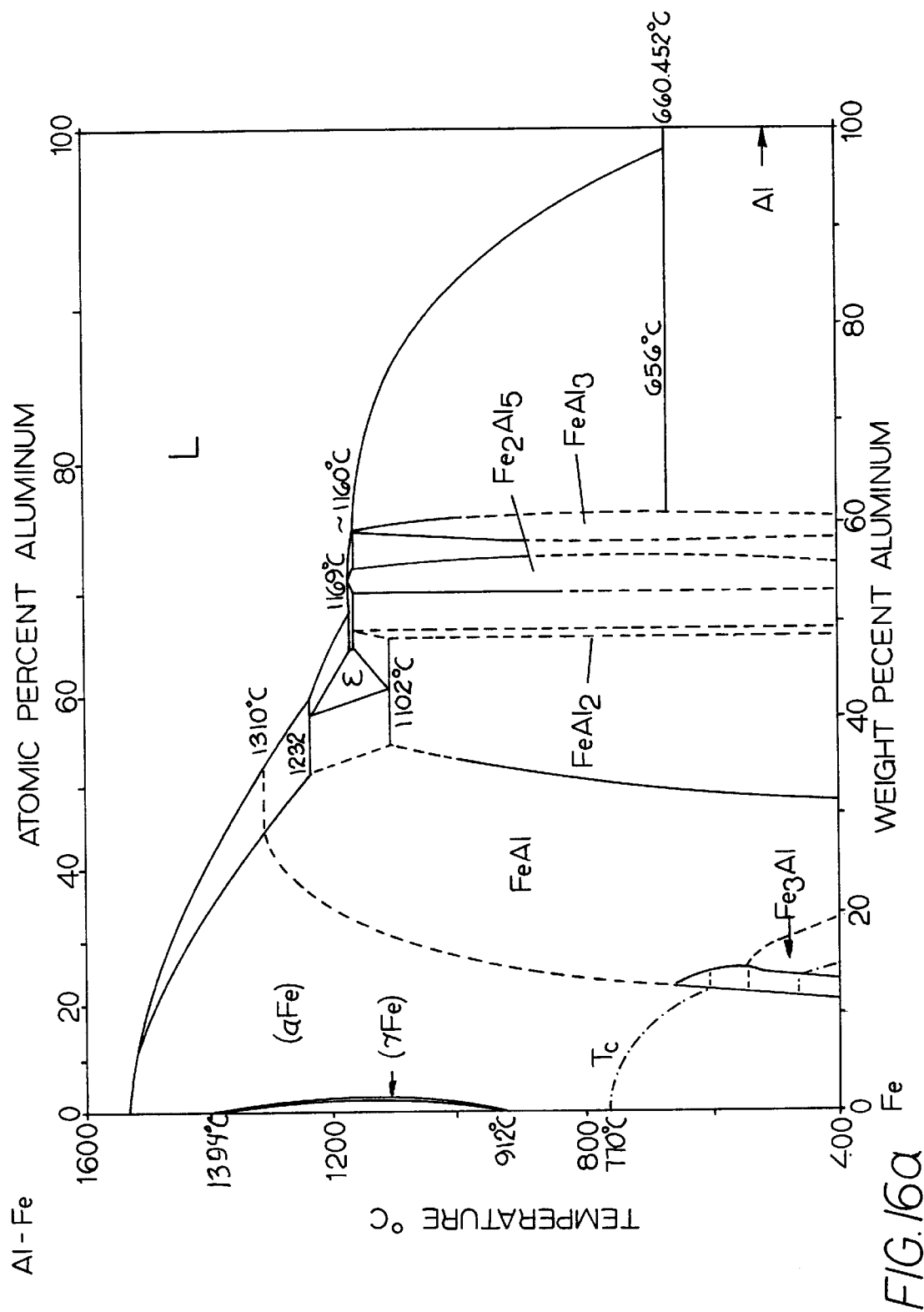
Figure 16B:
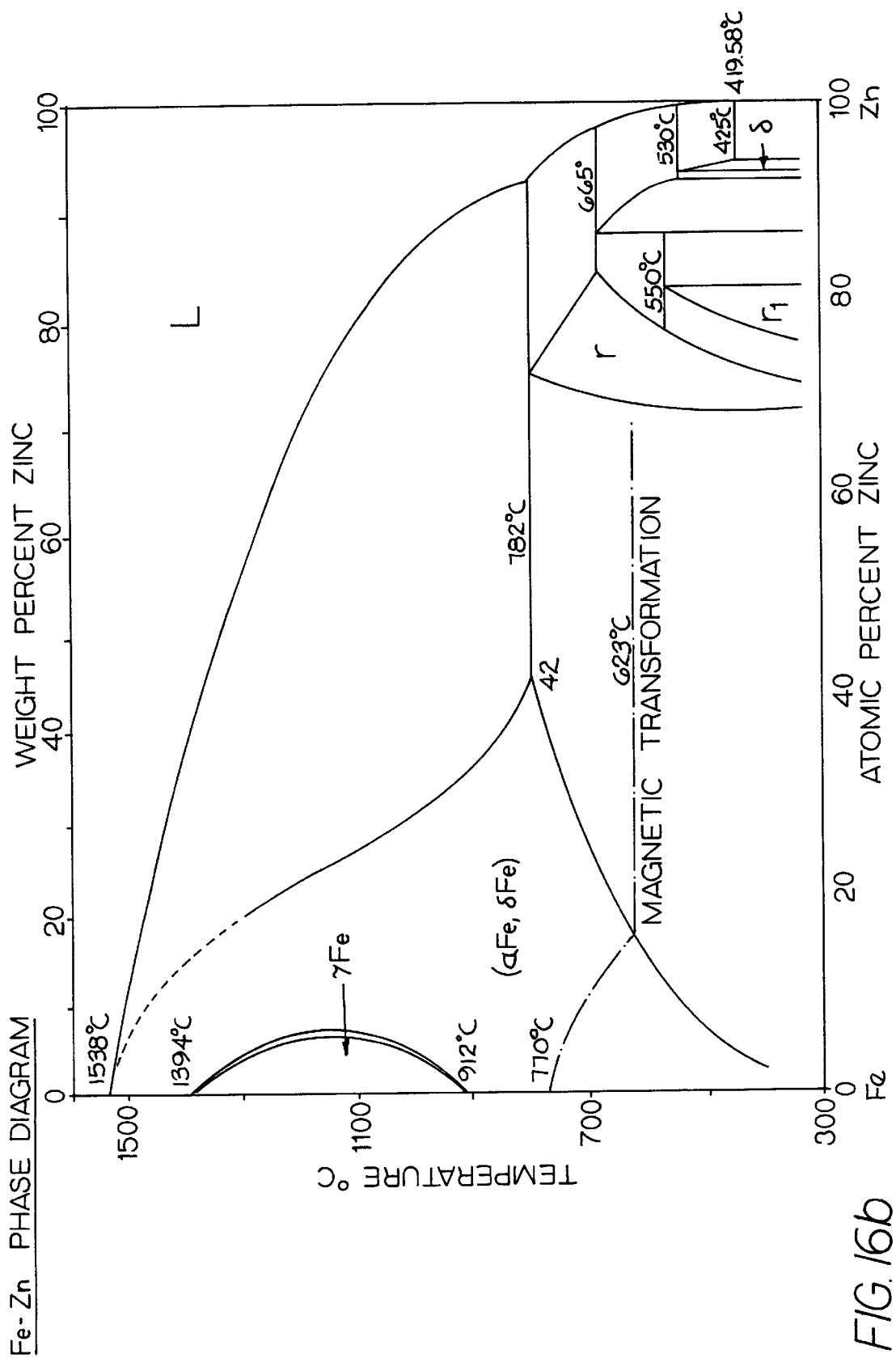
Figure 17A:
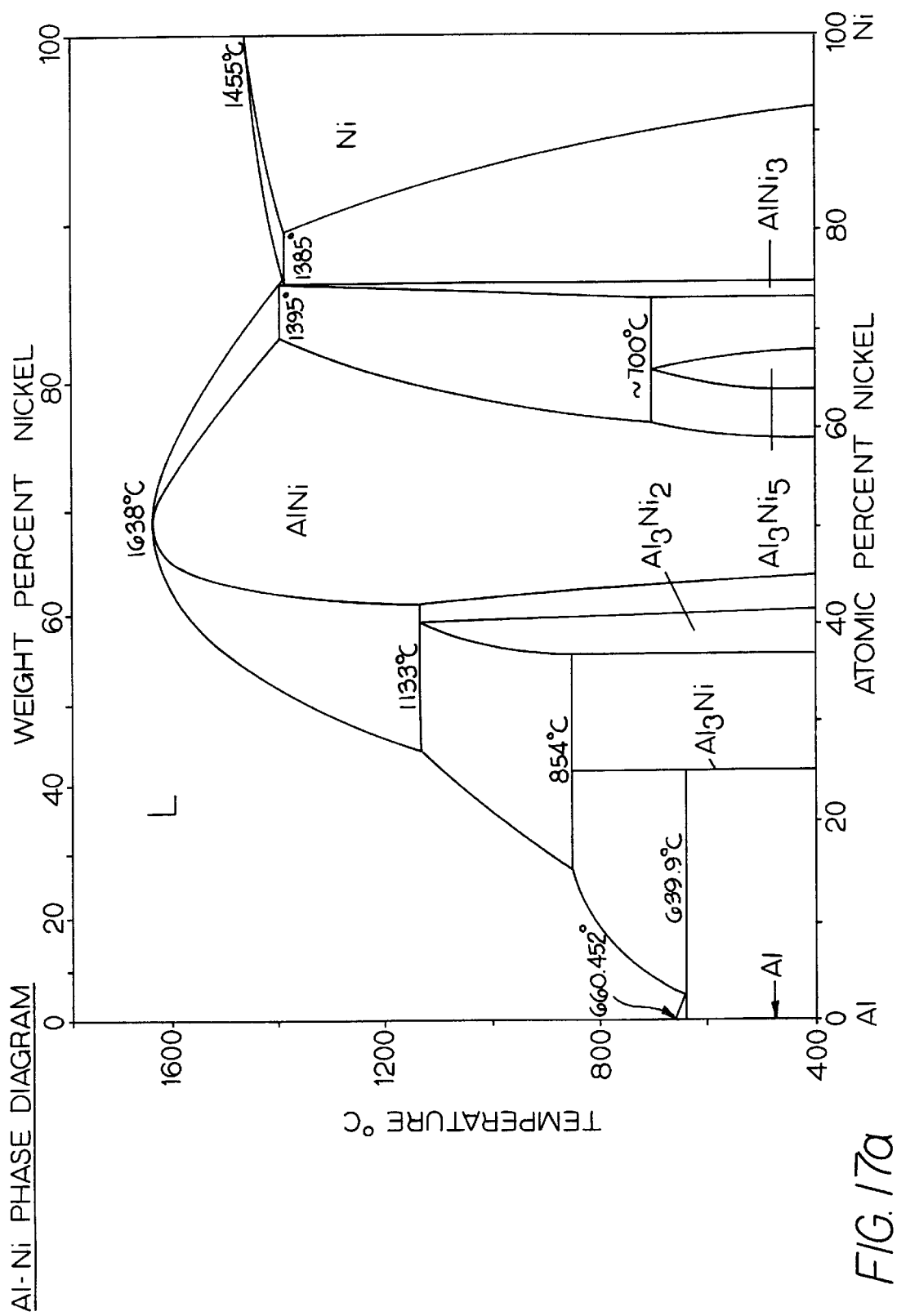
Figure 17B:
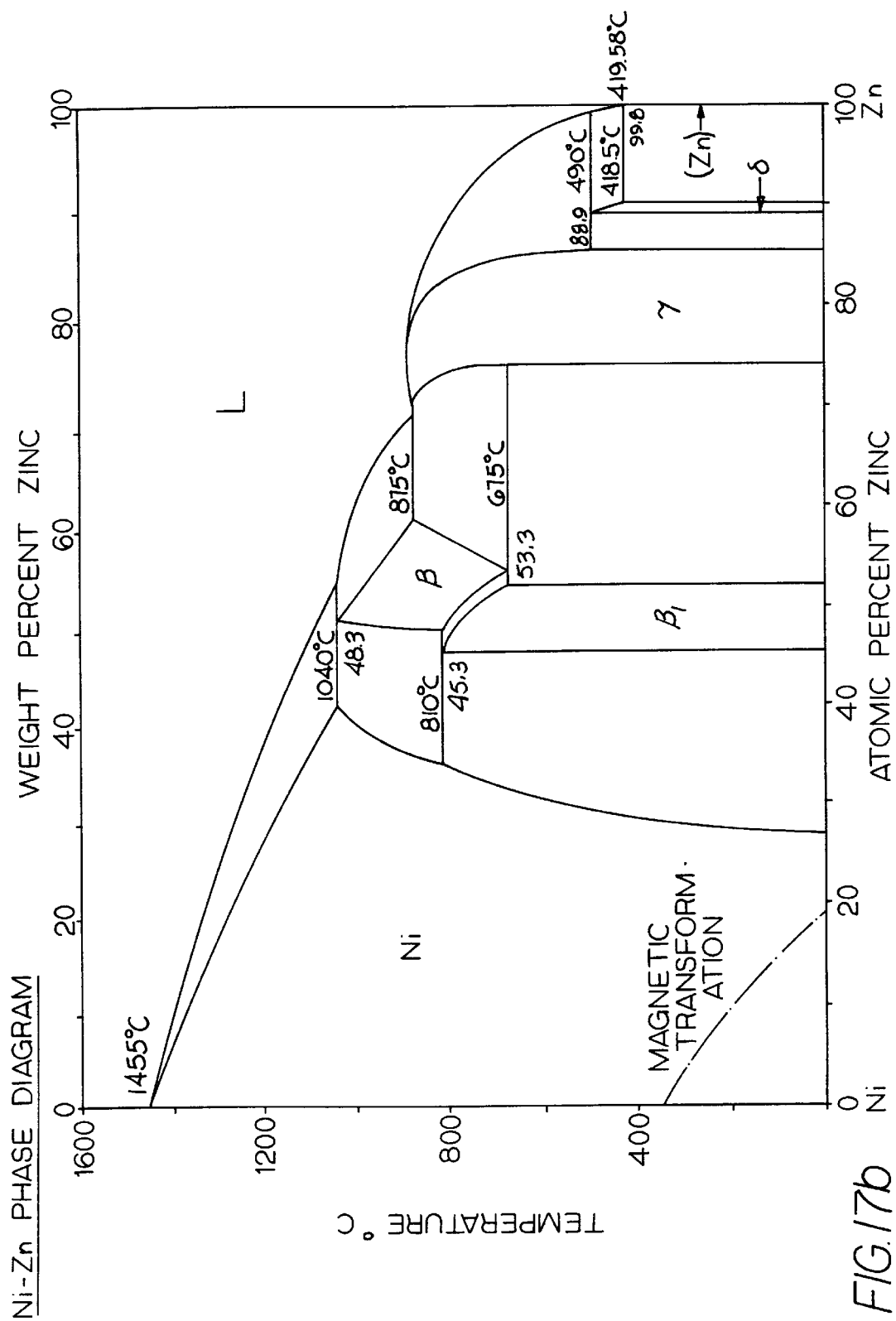
Figure 18A:
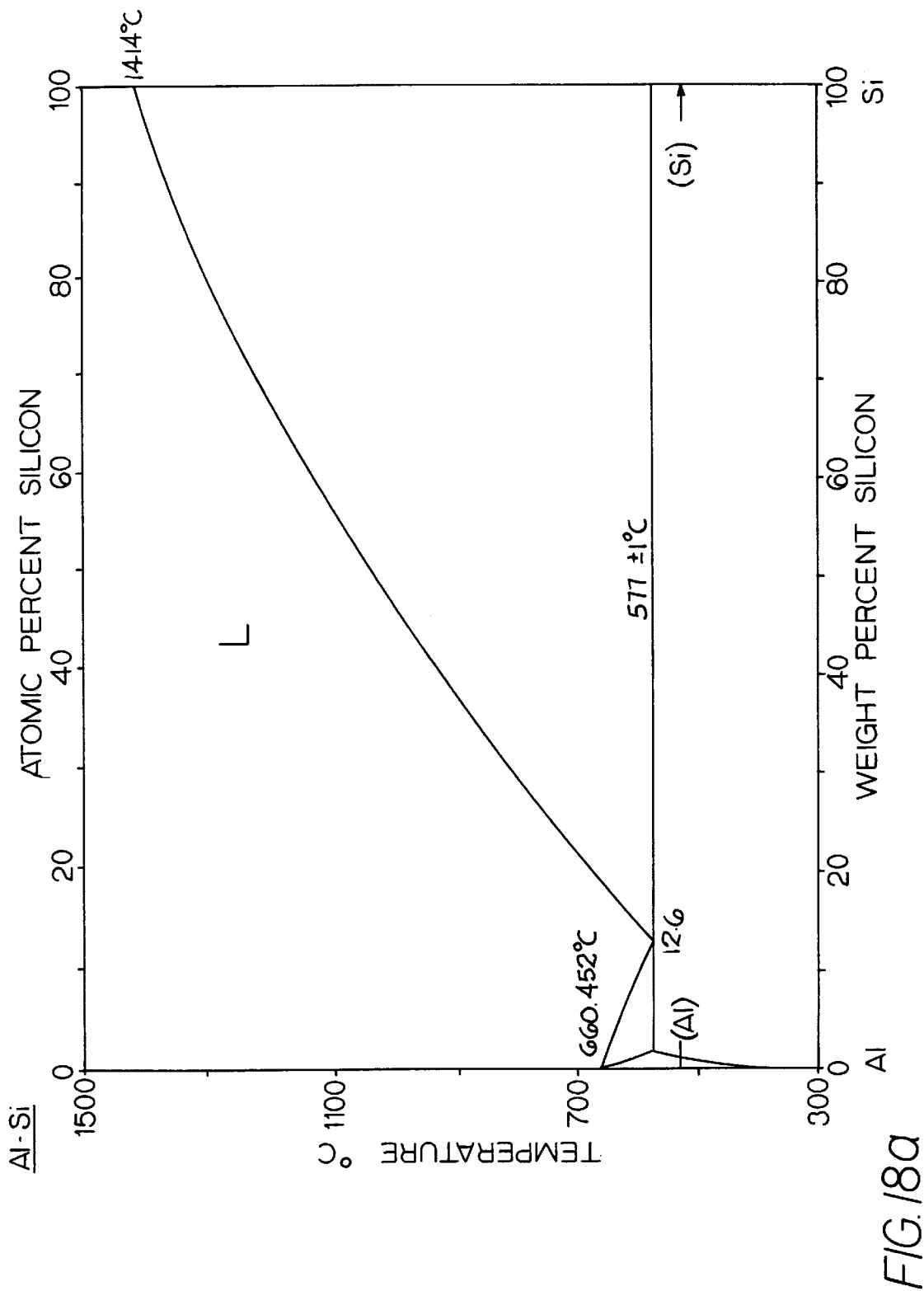
Figure 18B:
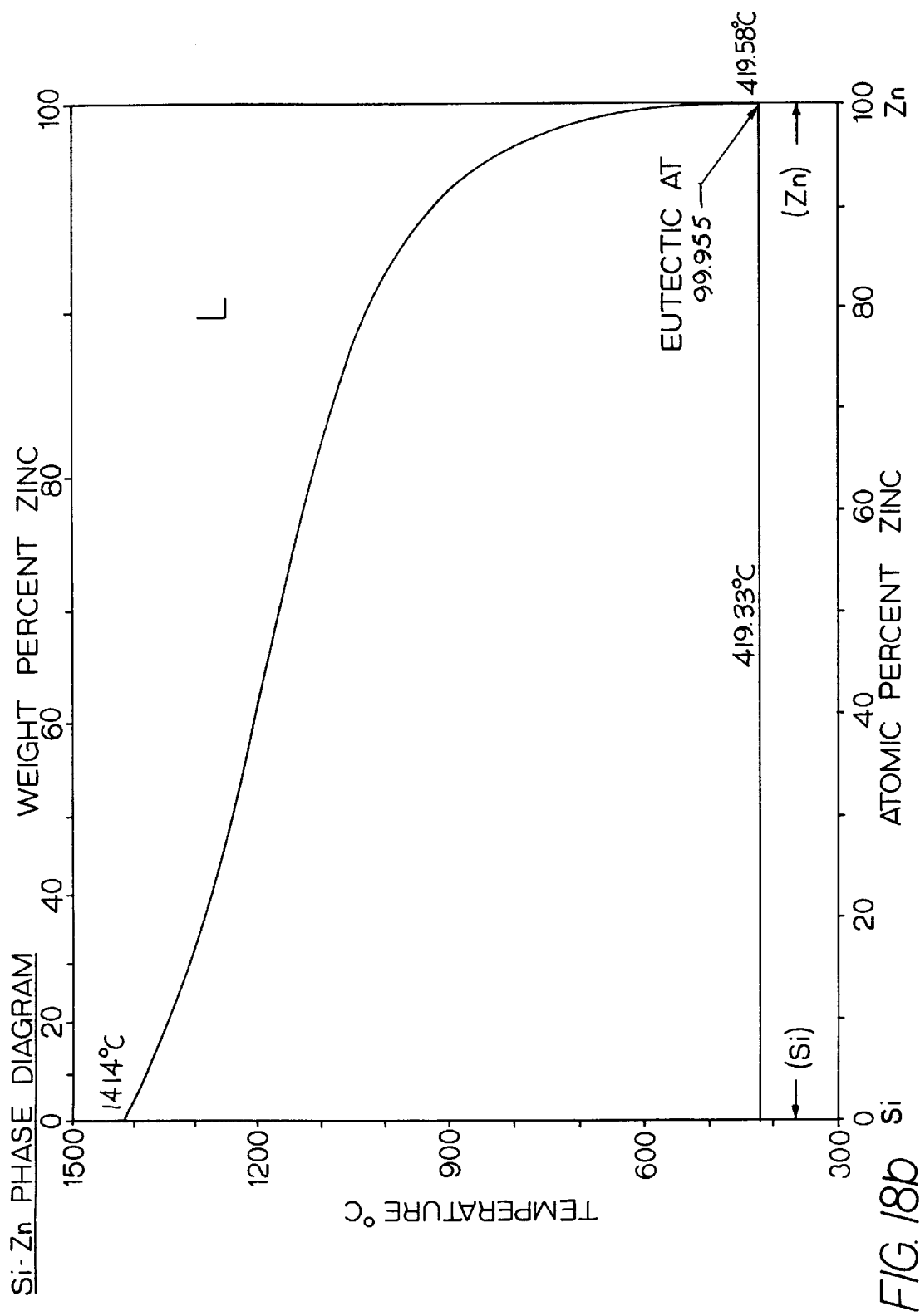
Figure 19:
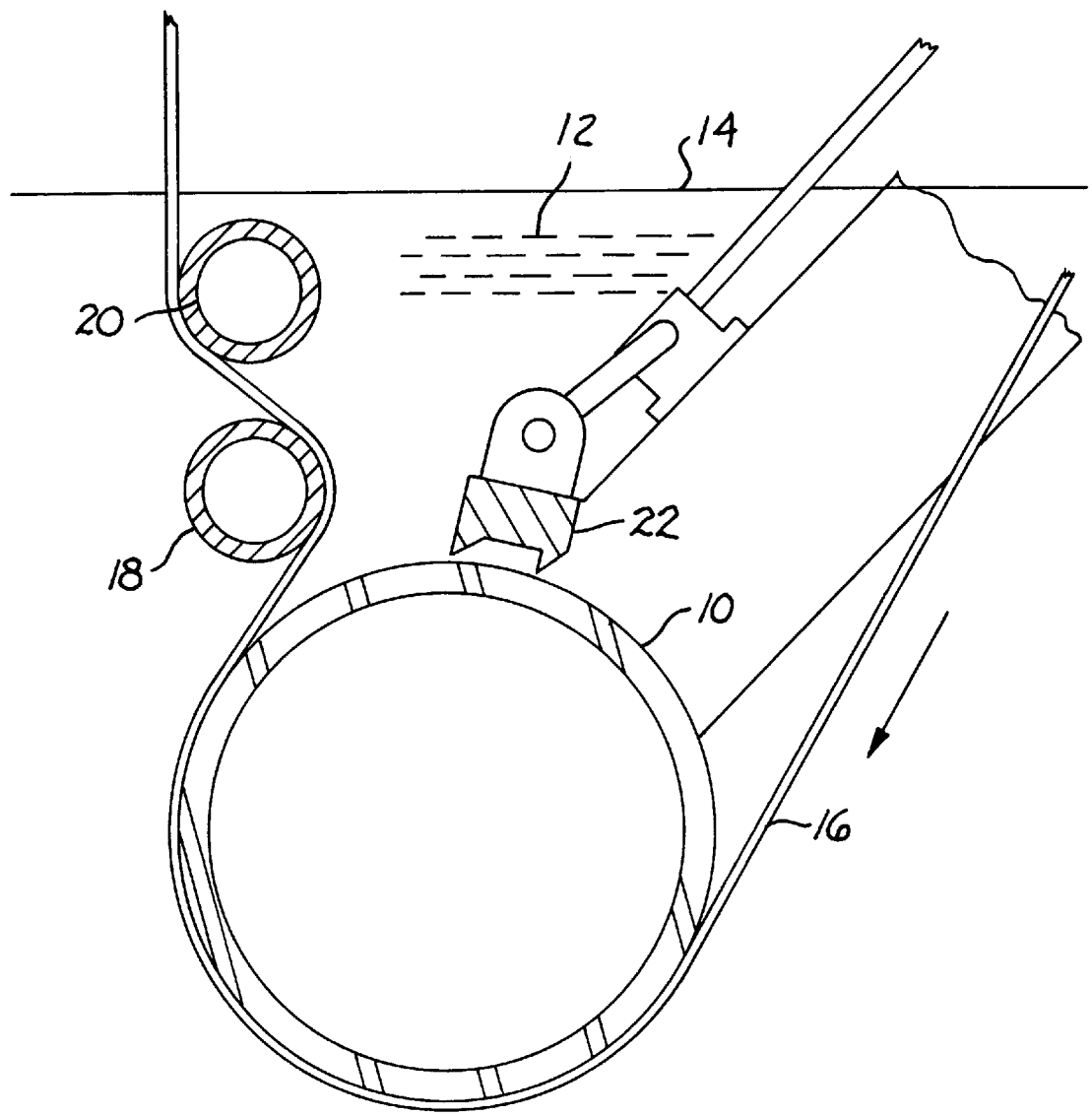

FIG. 8a is a graph showing the relationship between the intermetallic thickness μm formed with different additions of carbon;

FIG. 8b is a graph showing the relationship of the intermetallic thickness μm of Al—Fe formed with different additions of nickel;

FIG. 9a is a graph showing the relationship of the intermetallic thickness μm of Al—Fe formed with different additions of chrome;

FIG. 9b is a graph showing the relationship of the intermetallic thickness μm of Al—Fe formed with different additions of manganese;

FIG. 9c is a graph showing the relationship of the intermetallic thickness μm of Al—Fe formed with different additions of molybdenum;

FIGS. 10a and 10b are the Al—B Binary Alloy Phase Diagrams;

FIGS. 11a and 11b are the Binary Phase Diagrams of, respectively, Al—Co and Co—Zn;

FIGS. 12a and 12b are the Binary Alloy Phase Diagrams of, respectively, Al—Mo and Mo—Zn;

FIGS. 13a and 13b are the Binary Alloy Phase Diagrams of, respectively, Ti—Al and Zn—Ti;

FIGS. 14a and 14b are the Binary Alloy Phase Diagrams of, respectively, Al—V and V—Zn;

FIG. 15 is the Cr—Fe Binary Alloy Phase Diagram;

FIGS. 16a and 16b are the Binary Alloy Phase Diagrams of, respectively, Al—Fe and Fe—Zn;

FIGS. 17a and 17b are the Binary Alloy Phase Diagrams of, respectively, Al—Ni and Ni—Zn;

FIGS. 18a and 18b are the Binary Alloy Phase Diagrams of, respectively, Al—Si and Si—Zn; and FIG. 19 shows a roll made with an alloy in accordance with the invention and a mechanical scraper for removing dross from the roll.

DESCRIPTION OF THE PREFERRED EMBODIMENTS

According to one preferred embodiment of the invention, rolls made in accordance with the invention and generally as shown in FIG. 19, were made of the following alloys:

Composition of AT101 (For AL≧50%) in percent by weight:

| B | C | Co | Cr | Mn | Mo | Nb | Ni | Si | Ti | V | W | Zr | Fe |
|---|---|----|----|----|----|----|----|----|----|---|---|----|----|
| — | 2.2 | 15 | 18 | 1.0 | 4 | — | — | — | — | 3 | 10 | — | 45 |

Rc=42

Composition of AT103 (For Zn≧90°) in percent by weight:

| B | C | Co | Cr | Mn | Mo | Nb | Ni | Si | Ti | V | W | Zr | Fe |
|---|---|----|----|----|----|----|----|----|----|---|---|----|----|
| — | 2.0 | 4 | 27 | 6 | 4 | — | 20 | — | — | 4 | 12 | — | 21 |

Rc=42

Composition of AT101G (For AL≧95%)

| B | C | Co | Cr | Mn | Mo | Nb | Ni | Si | Ti | V | W | Zr | Fe |
|---|---|----|----|----|----|----|----|----|----|---|---|----|----|
| 2.0 | 2.0 | 5 | 16 | 1.0 | 4.0 | 2.0 | — | — | — | 3.0 | 16.0 | 1.0 | 47 |

Rc=50

Referring to FIG. 19, a typical roll 10 is illustrated in a galvanizing bath 12 below metal line 14. A metal strip 16 is trained around roll 12 and tensor rolls 18 and 20. Mechanical scraper 22 removes dross build-up on the roll.

These rolls were prepared by centrifugal casting methods, tested and the results, measured in terms of alloy loss into the bath were as follows:

(ΔD) Diameter Loss Per Day Vs. Roll Material and Melt Composition

| Roll Material of Test Samples | BATH MELT COMPOSITION | | | |
|---|---|---|---|---|
| | Zn @ 975° F. | 45% Zn + 55% AL 1120° F. | 95% AL + 5% Si 1280° F. | 100% AL 1360° F. |
| Cast Iron (2.0 C) | — | — | .080 IN/DAY | .120 IN/DAY |
| 52100 | — | .046 IN/DAY | .100 IN/DAY | — |
| 316L | .003 IN/DAY | .030 IN/DAY | .130 IN/DAY | .200 IN/DAY |
| AT101 | .0003 IN/DAY | .0035 IN/DAY | .012 IN/DAY | .020 IN/DAY |
| AT103 | .0000 IN/DAY | — | — | — |
| | 112 Day Test | 30 Day Test | 10 Day Test | 6 Day Test |

Corrosion Attack Ratios $$\frac{\Delta D \, CI}{\Delta D \, AT101} = 6.7 \text{ Times} \qquad \frac{\Delta D \, 316L}{\Delta D \, AT101} = 8.6 \text{ Times}$$

-continued $$\frac{\Delta D\,52100}{\Delta D\,\text{AT}101} = 13.1 \text{ Times} \quad \frac{\Delta D\,316L}{\Delta D\,\text{AT}103} = \infty$$

The following is a comparison of tests of a sink roll made with the inventive alloy and a conventional 52100 low carbon steel roll, when operating in molten 95% aluminum and 5% silicon at 1280° F.

| ROLL MATERIAL | | |
|---|---|---|
| | AT-101 | 52100 |
| Roll thickness | .650 in. | 3.00 in. |
| Roll hardness | R$_c$ 42 | R$_c$ 20 |
| Roll diameter spooling loss | .012/day | .080/day |
| Roll diameter corrosion loss | .012/day | .080/day |
| Roll dross adhesion | None | Medium to high |
| Roll surface damage | Minor (.50 in. dia.) | Major (2.0 in dia.) |
| Roll stability | Excellent (.001 in.) | Good (.010 in.) |
| Strip quality | Excellent | Good |
| Strip edge | Straight | Waving |
| Strip surface imperfection | None to minor | Minor to medium |
| Strip marks spandrel | Excellent | Good |
| Campaign length | 5 days * | 3 days *** |
| Number of campaigns | 4 ** | 5 |
| Total life | 20 days | 15 days |

\* Line never stopped because of sink roll failure or dross build-up.
\*\* Discontinued test because line maintenance shut down.
\*\*\* Line stopped four times because of sink roll dross build-up.

In another test, stabilizer roll half bushings made of the AT1 03 low solubility alloy was run in a 99% zone galvanizing line. Previous half bushings and sleeves made of Stellite material would wear out in four to five weeks.

The AT103 half bushings were placed into service with Stellite roll sleeves. The Stellite sleeves wore away within a one month period. The AT103 half bushings showed no "scoring" or "wear" on the I.D. The same bushings were reused with a new set of Stellite sleeves which were also worn through in a three week period. Visual inspection of the bushings after the second run showed no "scoring" and only slight wear on one side (probably due to misalignment).

Having described my invention, I claim:

1. An article intended to be submerged in molten zinc, aluminum and aluminum/zinc melts, said article comprised of a steel alloy material having the following composition:

| % | Component | % |
|---|---|---|
| 1.0 | <C< | 5.0 |
| 10.0 | <Cr< | 30.0 |
| 0.0 | ≦Ni< | 30.0 |
| 1.0 | <W< | 15.0 |
| 1.0 | <Mo< | 10.0 |
| 0.0 | <V< | 10.0 |
| 0.0 | <Nb< | 10.0 |
| 0.0 | <Co< | 20.0 |
| 0.0 | <B< | 5.0 |
| 10.0 | <Fe< | 50.0 |
| 0.0 | ≦Zr≦ | 6.0 |
| 2 | <Mn< | 6.5 |
| 0.0 | ≦Si< | 1.0 |

2. An article formed of an alloy as defined in claim 1, in which the alloy has a carbon element which is greater than 1.6% and less than 2.6% by weight.

3. An article formed of an alloy as defined in claim 1, in which the alloy has a chromium element which is greater than 15% and less than 30% by weight.

4. An article formed of an alloy as defined in claim 1, in which the alloy has a molybdenum element which is greater than 2% and less than 8% by weight.

5. An article formed of an alloy as defined in claim 1, in which the alloy has a vanadium element which is equal to or greater than 0% and less than 6% by weight.

6. An article formed of an alloy as defined in claim 1, in which the alloy has a niobium element which is equal to or greater than 0% and less than 6% by weight.

7. An article formed of an alloy as defined in claim 1, in which the alloy has a zirconium element which is equal to or greater than 0% and less than 6% by weight.

8. An article formed of an alloy as defined in claim 1, in which the amount of the article lost due to molten metal dissolution is less than $4 \times 10^{-5}$ inches per hour.

9. An article formed of an alloy as defined in claim 1, in which chromium is in a carbide form of the element.

10. An article formed of an alloy as defined in claim 1, having a Rockwell hardness greater than 40.

11. An article formed of an alloy as defined in claim 1, in which the alloy is centrifugally castable.

12. An article formed of an alloy as defined in claim 1, in which the alloy is machinable.

13. An article intended to be submerged in molten zinc, aluminum and aluminum/zinc melts, said article comprised of a steel alloy material having about the following composition:

| % | Component | % |
|---|---|---|
| 0.56 | < C < | 5.0 |
| 10.0 | < Cr < | 30.0 |
| 0.0 | ≦ Ni < | 30.0 |
| 1.0 | < W < | 30.0 |
| 1.0 | < Mo < | 10.0 |
| 0.0 | < V < | 10.0 |
| 0.0 | < Nb < | 10.0 |
| 0.0 | < Co < | 15.0 |
| 0.0 | < B < | 5.0 |
| 10.0 | < Fe < | 50.0 |
| 0.0 | ≦ Zr ≦ | 6.0 |
| 0.0 | < Mn < | 6.0 |
| 0.0 | ≦ Si < | 1.0 |

14. An article as defined in claim 1, in which the alloy has a nickel content which is equal to or greater than 10% by weight.

* * * * *